US011790300B2

(12) United States Patent
Reynolds et al.

(10) Patent No.: US 11,790,300 B2
(45) Date of Patent: Oct. 17, 2023

(54) SYSTEMS AND METHODS FOR GENERATING INSURANCE BUSINESS PLANS

(71) Applicant: State Farm Mutual Automobile Insurance Company, Bloomington, IL (US)

(72) Inventors: Janis M. Reynolds, Bloomington, IL (US); Charles Totoro, Normal, IL (US); Angie M. Bellas, Blomminton, IL (US); Nicholas Exner, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 10 days.

(21) Appl. No.: 17/392,734

(22) Filed: Aug. 3, 2021

(65) Prior Publication Data
US 2023/0042238 A1 Feb. 9, 2023

(51) Int. Cl.
*G06Q 10/06* (2023.01)
*G06Q 10/0637* (2023.01)
(Continued)

(52) U.S. Cl.
CPC ..... *G06Q 10/0637* (2013.01); *G06Q 10/06393* (2013.01); *G06Q 10/06398* (2013.01); *G06Q 10/063114* (2013.01)

(58) Field of Classification Search
CPC ..................................................... G06Q 10/06
See application file for complete search history.

(56) References Cited

U.S. PATENT DOCUMENTS 6,351,761 B1 2/2002 Cantone et al.
9,426,833 B2 8/2016 Mufti et al.
(Continued)

FOREIGN PATENT DOCUMENTS

WO WO-2006031747 A2 * 3/2006 ............ G06Q 40/08

OTHER PUBLICATIONS

Oracle Business Process Services, Big Data and Enterprise Data, Bridging Two Worlds with Oracle Data Integration, White Paper / Jan. 25, 2019. (Year: 2019).*

(Continued)

*Primary Examiner* — Kurtis Gills
(74) *Attorney, Agent, or Firm* — Lee & Hayes, P.C.

(57) ABSTRACT

Techniques described herein relate to computer-implemented systems and methods for generating an insurance business plan. The method includes receiving an identification of an agent associated with the insurance business plan and a selection of a future time period for the insurance business plan. A business plan objective graphical user interface (GUI) is displayed, presenting for selection a plurality of insurance business plan objectives, wherein one of the objectives is to grow or maintain insurance policy counts for one or more insurance lines of business. The business plan objective GUI receives a selection of the objective to grow or maintain insurance policy counts for one or more lines of business. Based on a determination that the objective to grow or maintain insurance policy counts for one or more lines of business has been selected, a plurality of insurance lines of business is displayed. The business plan objective GUI receives a selection of an insurance line of business of the plurality of insurance lines of business. Insurance policy information for insurance policies assigned to the agent in the selected line of business is retrieved from an insurance policy database over a network. Additionally, (Continued)

US 11,790,300 B2

Page 2 displayed is a goal setting GUI for the selected line of business, the goal setting GUI being populated based on the retrieved insurance policy information and including a policy count chart showing a number of insurance policies assigned to the agent having a selected status, among a plurality of statuses, during a historical period of time through the present and showing a number of polices projected to have the selected status during the selected future time period of the business plan.

20 Claims, 15 Drawing Sheets

(51) Int. Cl.
   *G06Q 10/0639* (2023.01)
   *G06Q 10/0631* (2023.01)

(56) References Cited

U.S. PATENT DOCUMENTS

| | | | |
|---|---|---|---|
| 9,779,173 | B2 | 10/2017 | Parsons et al. |
| 9,805,078 | B2 | 10/2017 | Agarwal et al. |
| 10,049,407 | B2* | 8/2018 | Bradshaw ............ G06Q 20/102 |
| 10,545,951 | B1 | 1/2020 | Lieberman |
| 10,713,726 | B1* | 7/2020 | Allen ..................... G06Q 40/08 |
| 10,775,976 | B1 | 9/2020 | Abdul-Jawad et al. |
| 11,087,403 | B2* | 8/2021 | Crabtree ................ G06Q 40/08 |
| 11,176,104 | B2 | 11/2021 | Chauhan |
| 2002/0188702 | A1 | 12/2002 | Short et al. |
| 2004/0143464 | A1* | 7/2004 | Houle ................... G06Q 10/10 705/4 |
| 2006/0136273 | A1* | 6/2006 | Zizzamia ............... G06Q 40/08 703/2 |
| 2007/0061487 | A1 | 3/2007 | Moore et al. |
| 2007/0195944 | A1* | 8/2007 | Korenblit ............... G06Q 50/20 379/265.06 |
| 2008/0172391 | A1 | 7/2008 | Adelman et al. |
| 2010/0180206 | A1 | 7/2010 | Silva, Jr. et al. |
| 2011/0022471 | A1 | 1/2011 | Brueck et al. |
| 2011/0265116 | A1 | 10/2011 | Stern et al. |
| 2013/0246588 | A1 | 9/2013 | Borowicz et al. |
| 2014/0156806 | A1 | 6/2014 | Karpistsenko et al. |
| 2014/0279764 | A1 | 9/2014 | Lahr |
| 2014/0282796 | A1 | 9/2014 | Walker et al. |
| 2014/0325366 | A1 | 10/2014 | Dunphey et al. |
| 2015/0040052 | A1 | 2/2015 | Noel et al. |
| 2015/0142501 | A1 | 5/2015 | Nair |
| 2015/0146963 | A1 | 5/2015 | Klein et al. |
| 2016/0034491 | A1 | 2/2016 | Chen |
| 2016/0328775 | A1 | 11/2016 | Lloyd et al. |
| 2017/0006135 | A1 | 1/2017 | Siebel et al. |
| 2017/0048095 | A1 | 2/2017 | Sun et al. |
| 2017/0168878 | A1 | 6/2017 | Chandra et al. |
| 2017/0171050 | A1 | 6/2017 | Puzis et al. |
| 2017/0192758 | A1 | 7/2017 | Apte et al. |
| 2017/0220334 | A1 | 8/2017 | Hart et al. |
| 2017/0223128 | A1 | 8/2017 | Shuvaev et al. |
| 2017/0331923 | A1 | 11/2017 | Smedberg et al. |
| 2017/0353946 | A1 | 12/2017 | Rico Alvarino et al. |
| 2018/0159746 | A1 | 6/2018 | Li et al. |
| 2018/0239615 | A1 | 8/2018 | Ravid et al. |
| 2019/0155961 | A1 | 5/2019 | Alonso et al. |
| 2019/0287032 | A1 | 9/2019 | Seabolt et al. |
| 2019/0378428 | A1 | 12/2019 | Nevarez et al. |
| 2020/0012656 | A1 | 1/2020 | Pugh et al. |
| 2020/0053280 | A1 | 2/2020 | Han et al. |
| 2021/0326336 | A1 | 10/2021 | Garapati et al. |
| 2023/0096917 | A1 | 3/2023 | Garapati |

OTHER PUBLICATIONS

Office Action for U.S. Appl. No. 16/417,943, dated Jun. 8, 2021, Garapati, "Big-Data View Integration Platform", 15 Pages.
Non Final Office Action dated Aug. 19, 2020 for U.S. Appl. No. 16/417,943, "Big-Data View Integration Platform", Garapati, 13 pages.
Non Final Office Action dated Aug. 24, 2020 for U.S. Appl. No. 16/417,943, "Big-Data View Integration Platform", Garapati, 15 pages Office Action dated Feb. 16, 2021 for U.S. Appl. No. 16/417,943, "Big-Data View Integration Platform", Garapati, 14 pages.
Office Action dated Feb. 16, 2021 for U.S. Appl. No. 16/417,943, "Big-Data View Integration Platform", Garapati, 14 pages.
U.S. Appl. No. 16/417,943 entitled Big-Data View Integration Platform, filed May 21, 2019.
U.S. Appl. No. 16/417,919 entitled Big-Data View Integration Platform, filed May 21, 2019.
U.S. Appl. No. 17/365,432 entitled Big-Data View Integration Platform, filed Jul. 1, 2021.
Office Action for U.S. Appl. No. 16/417,943, dated Dec. 8, 2021, Garapati, "Big-Data View Integration Platform", 17 Pages.
Office Action for U.S. Appl. No. 16/417,943, dated Apr. 18, 2022, Garapati, "Big-Data View Integration Platform", 20 pages.
Office Action for U.S. Appl. No. 17/365,432, dated Aug. 5, 2022, Garapati, "Big-Data View Integration Platform", 24 pages.

* cited by examiner

BUSINESS PLANNING BENEFITS IN AGENCY SUITE OF TOOLS

| 300 GOALS | 302 STRATEGY | 304 ACTION PLANS |
|---|---|---|
| ABILITY TO CAPTURE GOALS IN A CONSISTENT LOCATION | AUTO/FIRE GAIN STRATEGY CAN HELP YOU DOCUMENT ACTIVITIES SUPPORTING YOUR GOALS | ABILITY FOR YOU TO DESIGN ACTION PLAN |
| DISTRIBUTE GOALS 306 | TEAM ACCESS 308 | SUBMIT ONLINE |
| ABILITY TO DISTRIBUTE GOALS AND ACTION ITEMS TO YOUR TEAM | ABILITY TO EMPOWER YOUR TEAM THROUGH TEAM ACCESS AND CUSTOMIZED GOALS | ABILITY TO EASILY SUBMIT YOUR BUSINESS PLAN TO SALES LEADER |
| 310 REPORTING | 312 ON TARGET | MOBILE ACCESS |
| INTEGRATE CUSTOMIZABLE WEEKLY REPORTING FOR EACH LINE OF BUSINESS** | COMPARE OFFICE GOALS TO ACTUAL PRODUCTION | TRACK OFFICE PRODUCTION WHILE AWAY FROM OFFICE |

AGENCY SUITE OF TOOLS | BUSINESS PLANNING PLUS | [MODE: DEMO]

HELP ON THIS PAGE

400

CHARLES TOTORO

402 { AGENT CODE:   TERRITORY:   AGENT SINCE:   CONTRACT:

CHARLES, LET'S GET STARTED
HOW DO YOU WANT TO PROCEED WITH YOUR PLAN?
404

YEAR: 2022

STATUS: NEW

CONTINUE — 406

BUSINESS PLANNING PLUS (2022)  DRAFT VERSION

PLAN SELECTION > WHAT'S IMPORTANT > SETTING GOALS > SUMMARY > SEND TO ECRM    HELP ON THIS PAGE ⓘ

WHAT'S IMPORTANT?

SELECT YOUR OBJECTIVES, AND ENTER ANY SPECIFICS YOU KNOW RIGHT NOW. YOU CAN CHANGE THIS LATER. THE NEXT STEP IS TO FINE TUNE YOUR GOALS IN EACH LINE OF BUSINESS. CLICK NEXT TO NAVIGATE TO THE FIRST GOALS PAGE RELATED TO YOUR OBJECTIVES.

☑ GROW OR MAINTAIN MY POLICY COUNT ⓘ —502

| | |
|---|---|
| ☑ AUTO —600 | NUMBER TO GROW BY |
| ☑ FIRE —602 | NUMBER TO GROW BY |
| ☑ LIFE —604 | NUMBER TO GROW BY |
| ☑ HEALTH —606 | NUMBER TO GROW BY |

☐ INCREASING COMPENSATION ⓘ
☐ AGENT INCENTIVE PROGRAMS ⓘ
☐ SMALL BUSINESS PREMIER PROGRAM ⓘ

WHERE IS BANK ⓘ     MY OBJECTIVES ARE NOT LISTED ⓘ

( BACK )—510    ( NEXT )—512

PLAN SELECTION > WHAT'S IMPORTANT > SETTING GOALS > SUMMARY > SEND TO ECRM

BUSINESS PLANNING PLUS (2022)   HELP ON THIS PAGE

DRAFT VERSION

WHAT'S IMPORTANT?
SELECT YOUR OBJECTIVES, AND ENTER ANY SPECIFICS YOU KNOW RIGHT NOW. YOU CAN CHANGE THIS LATER. THE NEXT STEP IS TO FINE TUNE YOUR GOALS IN EACH LINE OF BUSINESS. CLICK NEXT TO NAVIGATE TO THE FIRST GOALS PAGE RELATED TO YOUR OBJECTIVES.

☐ GROW OR MAINTAIN MY POLICY COUNT — 502
☑ INCREASING COMPENSATION — 504

| ☑ AUTO — 700 | MIN: | MAX: | NUMBER TO GROW BY 50 | 1.00% |
| ☑ FIRE — 702 | MIN: | MAX: | NUMBER TO GROW BY 42 | 1.00% |
| ☑ LIFE — 704 | MIN: | MAX: | EARNED COMMISSIONS 57 | 2.00% |

706                                 708

☐ AGENT INCENTIVE PROGRAMS
☐ SMALL BUSINESS PREMIER PROGRAM

WHERE IS BANK?          MY OBJECTIVES ARE NOT LISTED.

BACK — 510          NEXT — 512

SYSTEMS AND METHODS FOR GENERATING INSURANCE BUSINESS PLANS

TECHNICAL FIELD

This disclosure relates to insurance and, more particularly, to computer-implemented systems and methods using graphical user interfaces for insurance business planning.

BACKGROUND

Typical office management software and/or platforms provide general business planning and compensation management capabilities, but fail to provide cross-platform, and cross business, solutions. Consequently, such office management software and/or platforms typically constitute waste in the form of end user manual work and or use, training, and/or dependency on multiple, disparate management software and/or platforms which leads to numerous inefficiencies. For example, end users generally require and rely on various manual processes and paperwork to manage their business and office staff. Conventional management software products generally fail provide comprehensive and business-need specific solutions that help end users (e.g., office personnel, agent(s), etc.) manage their office and business effectively. For example, such office software management products are generally narrowly focused, and have limited capabilities, and, thus, require an office to utilize multiple software products which can lead to inefficiencies, including redundancies and desynchronized data. In addition, data failures and redundancy in such office management products leads to potential errors and/or poor insights into real-time statuses of a plurality of business issues. For example, end users may be forced to manually synthesize/derive the information from paper files or non-integrated office management software products to perform evaluations or analysis, e.g., such as evaluating a team member's performance.

The disjoint and non-synchronous information of conventional office management software platforms creates several problems. For example, in the context of insurance, it makes business planning a tedious, fill-in-the-blank process using templates that require an agent to know, or find, all the relevant information needed for an effective plan, and then to choose goals for various lines of business without a good knowledge of the historical trends in his/her agency's performance. The resulting plans are not shared with any other tools or data sources and often come to a dead end for agents. Planning is something most agents do once a year to qualify for various incentive programs and then then put aside until it is time to plan for the next year. Thus, the business plans generated in this fashion provide little or no actual value to agents during the year as they manage their business.

For the foregoing reasons, there is a need for improved applications for insurance business planning.

SUMMARY

To address these and other problems and inefficiencies, this disclosure describes methods and systems for generating an insurance business plan. One aspect of the disclosure relates to a computer-implemented method for generating an insurance business plan. The method may include receiving an identification of an agent associated with the insurance business plan and a selection of a future time period for the insurance business plan. The method may include displaying a business plan objective graphical user interface (GUI) presenting for selection a plurality of insurance business plan objectives, wherein one of the objectives is to grow or maintain insurance policy counts for one or more insurance lines of business. The method may include receiving, via the business plan objective GUI, a selection of the objective to grow or maintain insurance policy counts for one or more lines of business and displaying for selection, based on a determination that the objective to grow or maintain insurance policy counts for one or more lines of business has been selected, a plurality of insurance lines of business. Additionally, the method may include receiving, via the business plan objective GUI, a selection of an insurance line of business of the plurality of insurance lines of business and retrieving, from an insurance policy database over a network, insurance policy information for insurance policies assigned to the agent in the selected line of business. Finally the method may include displaying a goal setting GUI for the selected line of business, the goal setting GUI being populated based on the retrieved insurance policy information and including a policy count chart showing a number of insurance policies assigned to the agent having a selected status, among a plurality of statuses, during a historical period of time through the present and showing a number of polices projected to have the selected status during the selected future time period of the business plan.

Another aspect relates to a computer-readable storage medium storing instructions that, when executed by a processor, cause the processor to perform a method for generating an insurance business plan. The method may include receiving an identification of an agent associated with the insurance business plan and a selection of a future time period for the insurance business plan. The method may include displaying a business plan objective graphical user interface (GUI) presenting for selection a plurality of insurance business plan objectives, wherein one of the objectives is to grow or maintain insurance policy counts for one or more insurance lines of business. The method may include receiving, via the business plan objective GUI, a selection of the objective to grow or maintain insurance policy counts for one or more lines of business and displaying for selection, based on a determination that the objective to grow or maintain insurance policy counts for one or more lines of business has been selected, a plurality of insurance lines of business. Additionally, the method may include receiving, via the business plan objective GUI, a selection of an insurance line of business of the plurality of insurance lines of business and retrieving, from an insurance policy database over a network, insurance policy information for insurance policies assigned to the agent in the selected line of business. Finally the method may include displaying a goal setting GUI for the selected line of business, the goal setting GUI being populated based on the retrieved insurance policy information and including a policy count chart showing a number of insurance policies assigned to the agent having a selected status, among a plurality of statuses, during a historical period of time through the present and showing a number of polices projected to have the selected status during the selected future time period of the business plan.

And yet another aspect relates to a computer terminal having a memory storing computer program instructions and one or more processors configured to execute the instructions to perform a method for generating an insurance business plan, including to receive input of an identification of an agent associated with the insurance business plan and a selection of a future time period for the insurance business plan. The one or more processors may further execute the instruction to display a business plan objective graphical user interface (GUI) presenting for selection a plurality of insurance business plan objectives, wherein one of the objectives is to grow or maintain insurance policy counts for one or more insurance lines of business. The one or more processors may further execute the instruction to receive, via the business plan objective GUI, a selection of the objective to grow or maintain insurance policy counts for one or more lines of business and to display for selection, based on a determination that the objective to grow or maintain insurance policy counts for one or more lines of business has been selected, a plurality of insurance lines of business. The one or more processors may further execute the instruction to receive, via the business plan objective GUI, a selection of an insurance line of business of the plurality of insurance lines of business and to cause the retrieval, from an insurance policy database over a network, insurance policy information for insurance policies assigned to the agent in the selected line of business. Finally, the one or more processors may further execute the instruction to display a goal setting GUI for the selected line of business, the goal setting GUI being populated based on the retrieved insurance policy information and including a policy count table showing a number of insurance policies assigned to the agent having each of a plurality of statuses during the historical period of time through the present and projected to have each of the plurality of statuses during the selected future period of time of the business plan.

BRIEF DESCRIPTION OF THE DRAWINGS

FIG. 3 shows a representation of a business planning software tool 202 among the software tools of FIG. 2, consistent with the disclosed embodiments;

FIG. 4 shows a representation of an exemplary plan selection graphical user interface (GUI) of the business planning software tool of FIG. 3;

FIG. 6 shows an example of the business plan objective GUI after selection of a grow or maintain my policy count interface element, consistent with the disclosed embodiments;

FIG. 7 shows an example of the business plan objective GUI after selection of a compensation interface element, consistent with the disclosed embodiments;

FIG. 8 shows an example of the business plan objective GUI after selection of an incentive program interface element, consistent with the disclosed embodiments;

FIG. 9 shows an example of the business plan objective GUI after selection of a small business premier program interface element, consistent with the disclosed embodiments;

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
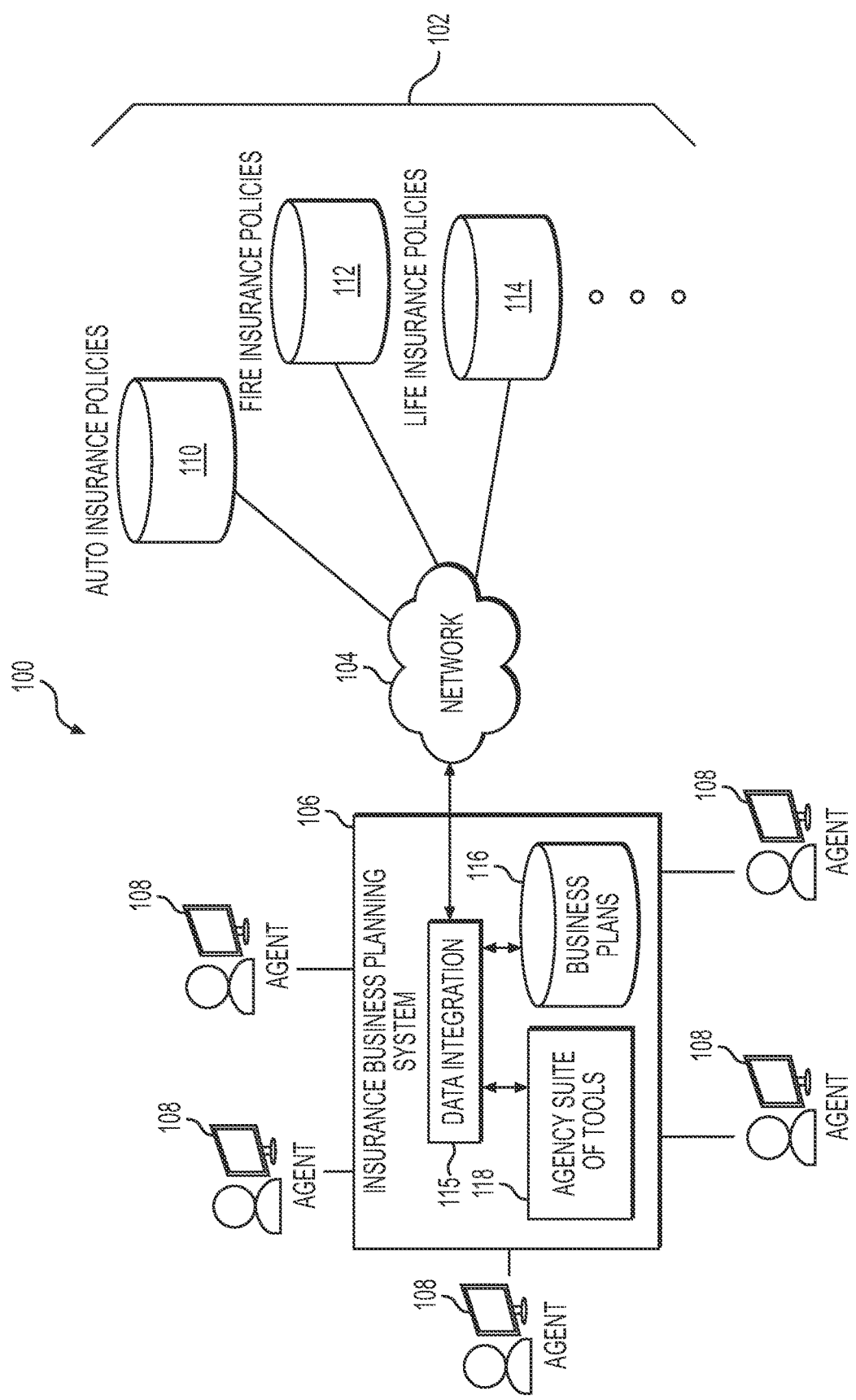
FIG. 1 is a diagram illustrating an example of an insurance provider system including an insurance business planning system, consistent with the disclosed embodiments.

FIG. 1 illustrates an example of an insurance provider system 100, consistent with the disclosed embodiments. Insurance provider system 100 may include a plurality of insurance policy databases 102 in communication, over an electronic communication network 104, with an insurance business planning system 106 operated by insurance agents 108 team members working on behalf of the insurance provider operating insurance provider system 100. Hereinafter, agents 108 and/or the team members may alternatively be referred to a "users" of insurance business planning system 106.

Insurance policy databases 102 may store information about insurance policies held by customer policy holders of insurance provider system 100 and managed by and/or assigned to agents 108. For example, auto insurance policy database 110, fire insurance policy database 112, and life insurance policy database 114 may respectively store information for automobile, fire, and life insurance policies held by the customers of insurance provider system 100. Although not shown, depending upon the particular implementation or insurance provider, insurance provider system 100 may include additional insurance policy databases 102, such as renter's, liability, motorcycle, motor home, flood insurance., etc. databases.

In some cases, insurance policy databases 102 may be associated with computing systems of different insurance companies that underwrite or service insurance policies on behalf of the insurance provider operating insurance provider system 100. Thus, insurance policy databases 102 may, for example, be part of legacy systems, platforms, or services using disparate data communication protocols and/or data formats. As discussed below, in such cases, insurance business planning system 106 may be configured to collate and integrate the disparate information from insurance policy databases 102 in order to carry out the processes discussed herein, including generating insurance business plans for agents 108. In contrast to preexisting systems, insurance provider system 100 may reduce the time for agents 108 to search for and acquire the information needed to make a business plan. This allows them to focus on the task at hand rather than the logistics of gathering and collating the necessary insurance information, allowing agents 108 to create a better plan and make data-driven decisions with less guesswork.

Insurance business planning system 106 may be a computing system, such as a server system, associated with the insurance provider. As shown in FIG. 1, insurance business planning system 106 may have a data integration component 115 configured to receive insurance policy information from insurance policy databases 102 over network 104. Data integration component 115 may be configured to collate and integrate the disparate information received from insurance policy databases 102 into a consistent format for use by insurance business planning system 106. For example, data integration component 115 may receive the insurance policy information from each insurance provider database 102 contained in differing types of markup languages files—such as JavaScript object notation (JSON) files, flexible data structures, or other types of metadata files—and may convert the differing file types into the same file format such as XML.

Also as shown in FIG. 1, insurance business planning system 106 may include a business plan database 116 storing business plans for agents 108 generated by insurance business planning system 106, as discussed below. It is noted that business plan database 116 and insurance policy databases 102 may comprise any type of database known in the art. This includes, for example, relational databases such as IBM's DB2, PostgreSQL, or ORACLE databases. Alternatively, databases 102, 116 may comprise unstructured databases storing information in a markup language such as XML or JSON that may be used with flexible client-server or interface libraries such as React, jQuery, or other similar interfaces to access the data stored in databases 102, 116.

As shown in FIG. 1, insurance business planning system 106 may be configured to provide an agency suite of software tools 118 for use by agents 108. Software tools 118 may include business management tools, applications, and/or analytical capabilities to assist users in creating agency business goals and aligning those goals with the enterprise goals of the insurance provider and thereby grow agency-related business appropriately and efficiently.

Figure 2:
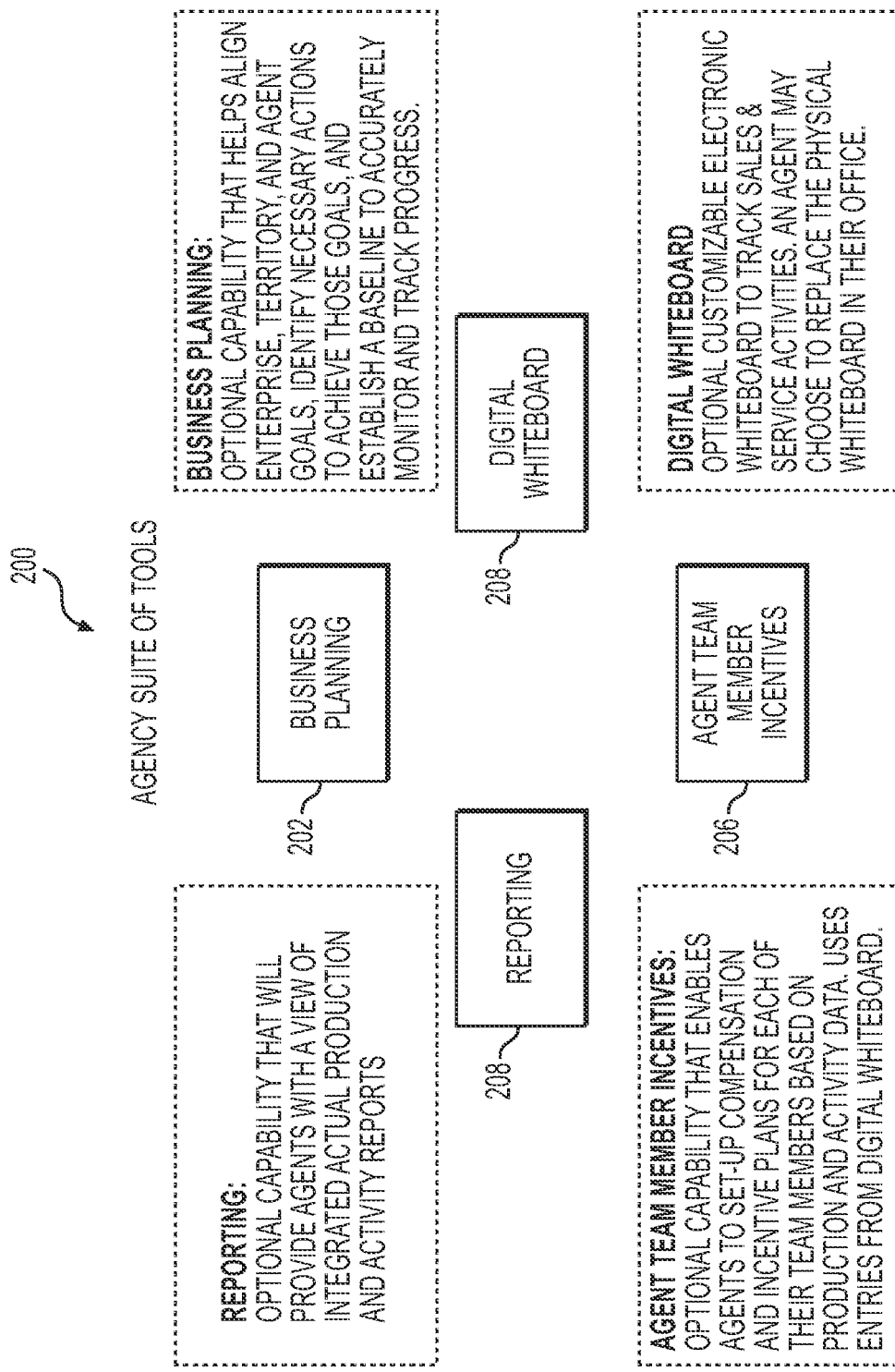
FIG. 2 shows a representation of software tools associated with the insurance business planning system of FIG. 1, consistent with the disclosed embodiments.

FIG. 2 shows a representation of software tools 118 consistent with the disclosed embodiments. In one embodiment, software tools 118 may be independent but unified and/or cross-platform tools or components using associated graphical user interfaces (GUIs) to carry out various business-related tasks. For example, software tools 118 may include a business planning software tool 202, a digital whiteboard software tool 204, a team member incentives software tool 206, and a reporting software tools 208. In some embodiments, software tools 202-208 may communicate, or interoperate with one another within insurance provider system 100.

Business planning software tool 202 may include, for example, integrated GUIs that assist users such as agents 108 to create agency business goals; align enterprise, territory, and agency goals; identify necessary actions to achieve those goals; and establish a baseline to accurately monitor and track progress. Business planning software tool 202 is discussed in detail below with respect to FIGS. 3-15.

Digital whiteboard software tool 204 may include, for example, integrated GUIs with a customizable electronic whiteboard to track sales and service activities. For example, in some embodiments, digital whiteboard reports may be generated based on activity type or other metrics as described herein. In various embodiments, digital whiteboard entry data may receive data from or send data to other elements of insurance provider system 100, such as insurance policy databases 102 and/or 112. In some embodiments, digital whiteboards may be pre-populated with data, eliminating the need for manual entries into the digital whiteboard.

Digital whiteboards generated with digital whiteboard software tool 204 may provide agents 108 with a customizable electronic whiteboard for tracking production and service activities. Through insurance business planning system 106, the digital whiteboard may offer permanent data capture solutions across various activities. For example, a digital whiteboard may be used to electronically assign activities to agents and/or other team members. In some embodiments, entering of quotes, applications, and other activities may be automated by the digital whiteboard. In addition, digital whiteboards may include a reporting capability that allows agents to access detailed activity reports by team member or level at an office level. In some embodiments, digital whiteboards may provide agents 108 or team members with the ability achieve business goals by being able to set clear expectations, monitor and lead team sales and service activities in real-time and identify coaching opportunities for team members.

Team member incentives software tool 206 may include integrated GUIs that enable agents or other team members to set-up compensation and incentive plans for each of their team members based on production and activity data. Such embodiments may utilize data and entries from the digital whiteboards discussed above.

Reporting software tool 208 may include, for example, integrated GUIs that provide users with views or renderings of integrated actual production and activity reports. For example, in some embodiments, reporting software tool 208 may pull data from automatic weekly production reports. Such an implementation may integrate an automatic comparison of business plan goals with actual production that can be viewed as a dashboard on integrated GUI(s).

FIG. 3 shows a representation of business planning software tool 202 in more detail. Business planning software tool 202 may be an interactive application allowing agents 108, or other team members, to create and/or update an electronic business plan, among other things. For example, using a goals component 300, agents 108 may choose to electronically set and distribute business plan goals and action plan items to individual team members. In such embodiments, an electronic business plan may automatically be saved and may be easily be accessed over a period of time (e.g., a year). Additionally, or alternatively, the electronic business plan may allow for mobile access via smart phone or tablet through components as described herein and/or mobile platforms or applications (apps).

In a further example, a strategy component 302, which may include business specific tools (e.g., an Auto Gain Strategy tool and/or a Fire Gain Strategy tool), may be built-in and part of the goal-based feature. The tools may include components that determine what specific activities are needed to accomplish the set goals.

In a further example, an action plan component 304 may be used with the goal and strategy components 300, 302 and allow the agent 108 or other team member to identify what specific marketing activities are needed to accomplish the desired goal. This allows the user to start thinking about how the goals will be accomplished.

In a further example, a goal distribution component 306 may be used to identify team members who will be responsible for what activities and generate a team plan. The goal distribution component 306 may be used to distribute goals and action items. In some embodiments, team members may be assigned their own, smaller team member plan as part of a lager electronic plan. Such detailed level of planning may result in shared accountability among the team. Various integration GUIs, as described herein, may provide access to the goal-distribution based feature, e.g., to visit their distributed/assigned goal.

In a further example, a team access component 308 may be used to allow team members, regardless of status, to access insurance provider system 100. Agents 108 or other team members may allow a business plan, or certain parts thereof, to become a shared team goal.

In a further example, a reporting component 310 may include integrated, automatic reporting and dashboards on an application layer (e.g., a homepage) for weekly updates with the most recent data available for each line of insurance business. In some embodiments, business planning software tool 202 may implement the reporting feature.

In a further example, a target component 312 may be used determine or generate reports showing goals and actual production and generate dashboards that compare set goals to actual production. Such reports and/or dashboards may help end user(s) monitor progress throughout a year, weekly basis, or other time period.

In various embodiments, each of the above example components 300-312 and features may be accessed, updated, or otherwise manipulated via dashboards and/or components through the application layer (e.g., via a homepage) of a technical end-user platform, e.g., to provide homepage visuals. Such information in provided in a unified, "one stop, one tool," which provide a singular electronic location for planning and reporting. In such embodiments, data pulled, pushed, and/or queued from various sources is integrated into singular view(s) as described herein.

FIG. 4 shows a representation of a plan selection GUI 400 of business planning software tool 202, consistent with the disclosed embodiments. For example, plan selection GUI 400 may be associated with goal component 300, strategy component 302, or action plan component 304 and may allow a user to initiate creation or modification of an agent's business plan.

As shown, plan selection GUI 400 may include agent information 402 identifying: (1) the agent 108, such as by name and/or agent ID (e.g., Charles Totoro), for whom a business plan is being created or modified; (2) the territory in which the agent 108 operates; (3) the date since which the agent 108 has been an insurance agent on behalf of the insurance provider; and (4) an identification of the contract under which the agent 108 works with the insurance provider. Plan selection GUI 400 may include a year interface element 404 allowing the agent 108 or other team member on behalf of the agent 108 to select a year for which to create a new business plan or modify an existing business plan. Plan selection GUI 400 may also include a continue interface element 406, the selection of which causes business planning software tool 202 to initiate creation of a new business plan or modification of an existing business plan.

Figure 5:
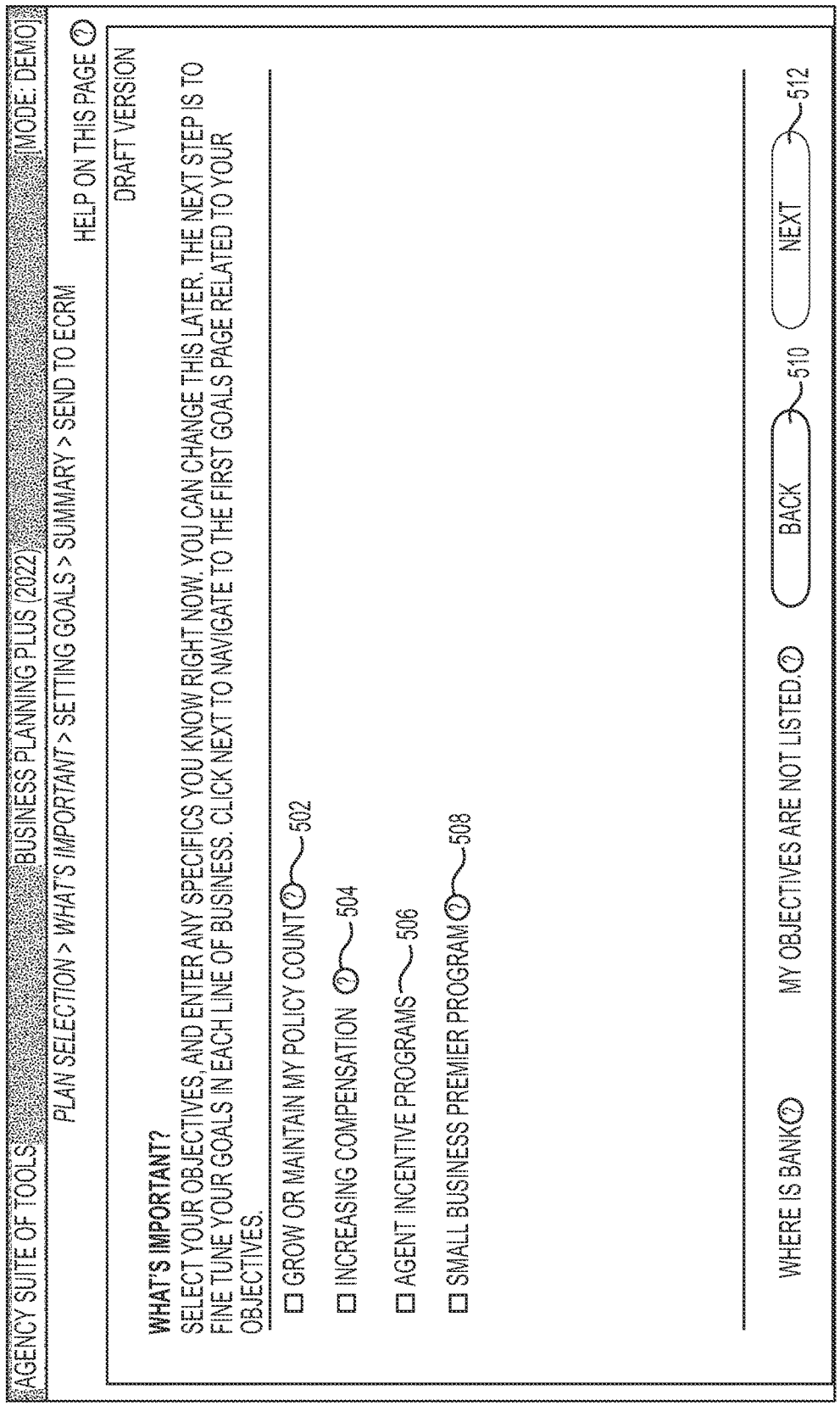
FIG. 5 shows a representation of an exemplary business plan objective GUI of the business planning software tool, consistent with the disclosed embodiments.

For example, selection of continue interface element 406 may cause business planning software tool 202 to proceed to business plan objective GUI 500, shown in FIG. 5. Business plan objective GUI 500 may allow the agent 108 or other team member to select which goal objectives are deemed important in creating or modifying the business plan for the selected year. For example, business plan objective GUI 500 may include a grow or maintain my policy count interface element 502. The user may select grow or maintain my policy count interface element 502 if the agent has a goal to grow the number of active insurance policies sold by that agent in one or more lines of business (e.g., auto and/or fire) for the calendar year associated with the business plan.

Business plan objective GUI 500 may also have an increasing compensation interface element 504. Insurance agents are often compensated by the insurance providers on whose behalf they work periodically based on the number and type of policies in an active status, sold, or other criteria. The user may provide input to select increasing compensation interface element 504 if it is the agent's goal is to increase the agents compensation over the course of the calendar year associated with the business plan, for example, by hitting certain growth targets or objectives needed to qualify for increased compensation.

Business plan objective GUI 500 may include an agent incentive program interface element 506. The agent or other team member may provide input to select agent incentive program interface element 506 if it is a goal to increase the agents' qualifications for incentive programs offered by the insurance provider over the course of the calendar year associated with the business plan. For example, by selling a certain number of policies, or a certain number of policies of a qualifying type, the agent may qualify for a certain incentive program. Examples include an all-expenses paid vacation, promotional deals, free goods or services, etc.

Business plan objective GUI 500 may further include a small business premier program interface element 508. The user may provide input to select small business premier program interface element 508 if the agent has a goal to sell enough qualifying insurance policies in order to qualify for the Small Business Premier Program. For example, if an agent 108 sells enough policies of a certain type, the agent may qualify for a program that recognizes or highlights prominent insurance professionals or companies working in certain lines of business, having a particular interest or focus in a line of business, having received awards for their performance, etc.

Business plan objective GUI 500 may have a back interface element 510, the selection of which causes business planning software tool 202 to return to plan selection GUI 400 (FIG. 4). Business plan objective GUI 500 may also have a next interface element 512, the selection of which causes business planning software tool 202 to proceed to setting goals GUIs, discuss below.

FIG. 6 shows an example of business plan objective GUI 500 after selection of grow or maintain my policy count interface element 502. For example, GUI 500 may present grow or maintain auto, fire, life, and/or health insurance policy count interface elements 600-606 as drop-down interface elements. If the agent has a goal to grow or maintain the agent's number of active auto, fire, life, and/or health insurance policies for the calendar year associated with the business plan, the user may select respective elements 600-606. Each of elements 600-608 may be associated with a corresponding number of policies to grow by interface element 610. The user may use grow by interface elements 610 to enter the number of polices by which the agent has a goal to grow the auto, fire life, or health insurance lines of business, respectively, in the calendar year for the business plan.

FIG. 7 shows an example of business plan objective GUI 500 after selection of increasing compensation interface component 504. For example, business plan objective GUI 500 may present compensation policy interface elements 700-704 for auto, fire, and life insurance lines of business, respectively. Each of compensation policy interface elements 700-704 may be associated with a corresponding compensation percentage growth interface element 706 (e.g., a slider) and compensation policy number growth interface element 708. If the agent has a goal to grow the agent's compensation for the auto line of business by 3% in the calendar year for the business plan, for example, the user may adjust the compensation percentage growth interface element 706 for auto to 3%. Alternatively, if the agent has a goal to grow the agent's compensation for the auto line of business based on a certain number of policies, the user may input that number into the compensation policy number growth interface element 708 for auto, and business planning software tool 202 may compute the corresponding percentage and display it within interface element 708 as shown in FIG. 7. The compensation percentage growth interface elements 706 and policy number growth interface elements 708 for the fire and life insurance lines of business may operate in the same way as described for the auto line of business.

Figure 8:
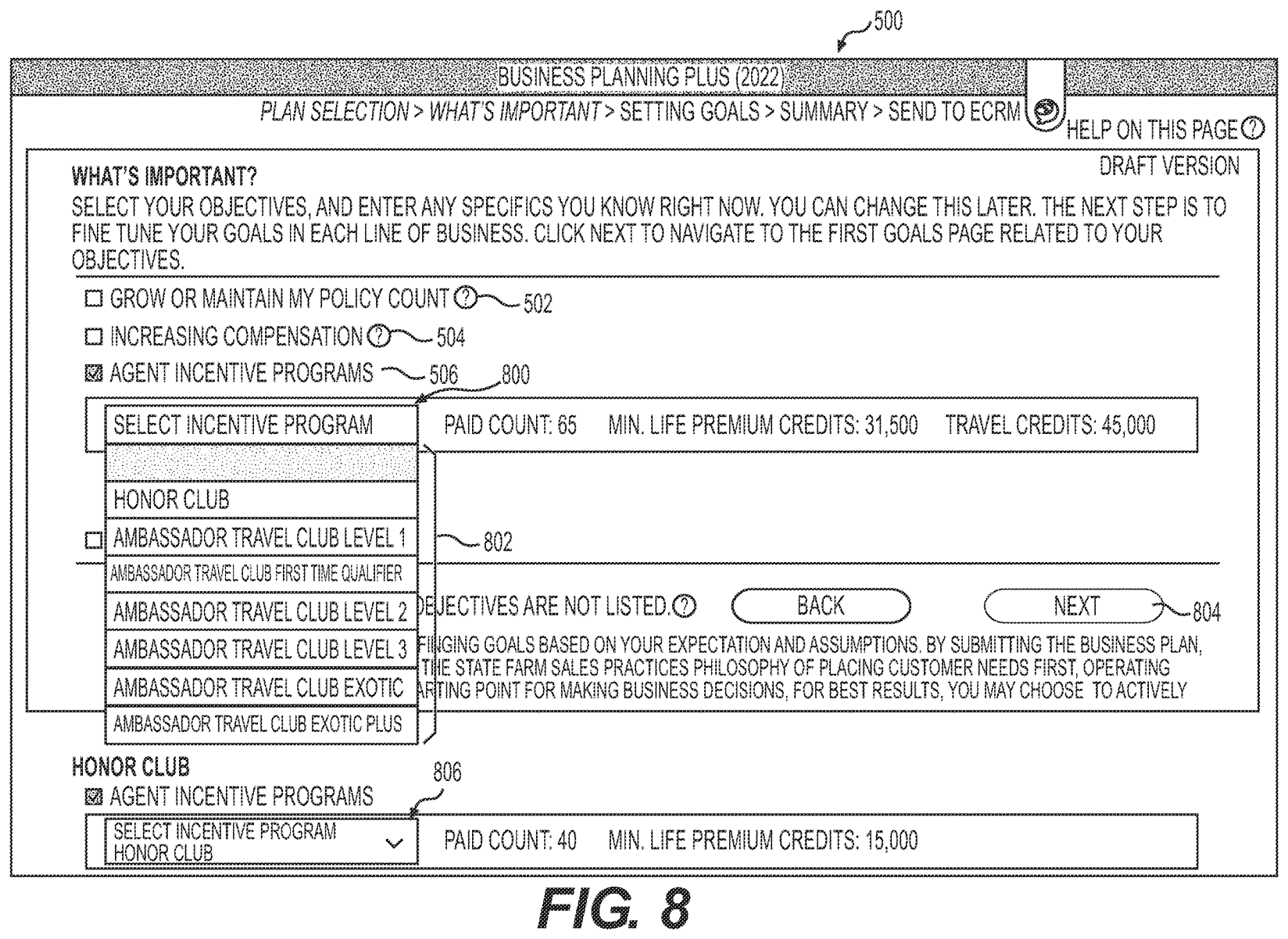

FIG. 8 shows an example of business plan objective GUI 500 after selection of incentive program interface element 606. For example, business plan objective GUI 500 may present incentive selection interface element 800, which may be a drop-down menu. Incentive program selection interface element 800 may list as options a plurality of available incentive programs 802 (e.g., Honor Club, Ambassador Travel Club, etc.) The user may provide input to incentive program selection interface element 800 to select a desired incentive program 802 for which the agent has a goal to qualify in the calendar year of the business plan. The user may use next interface element 804 to add another incentive program selection interface element 806 to select an additional incentive program for which the agent has a goal to qualify in the calendar year of the business plan.

Figure 9:
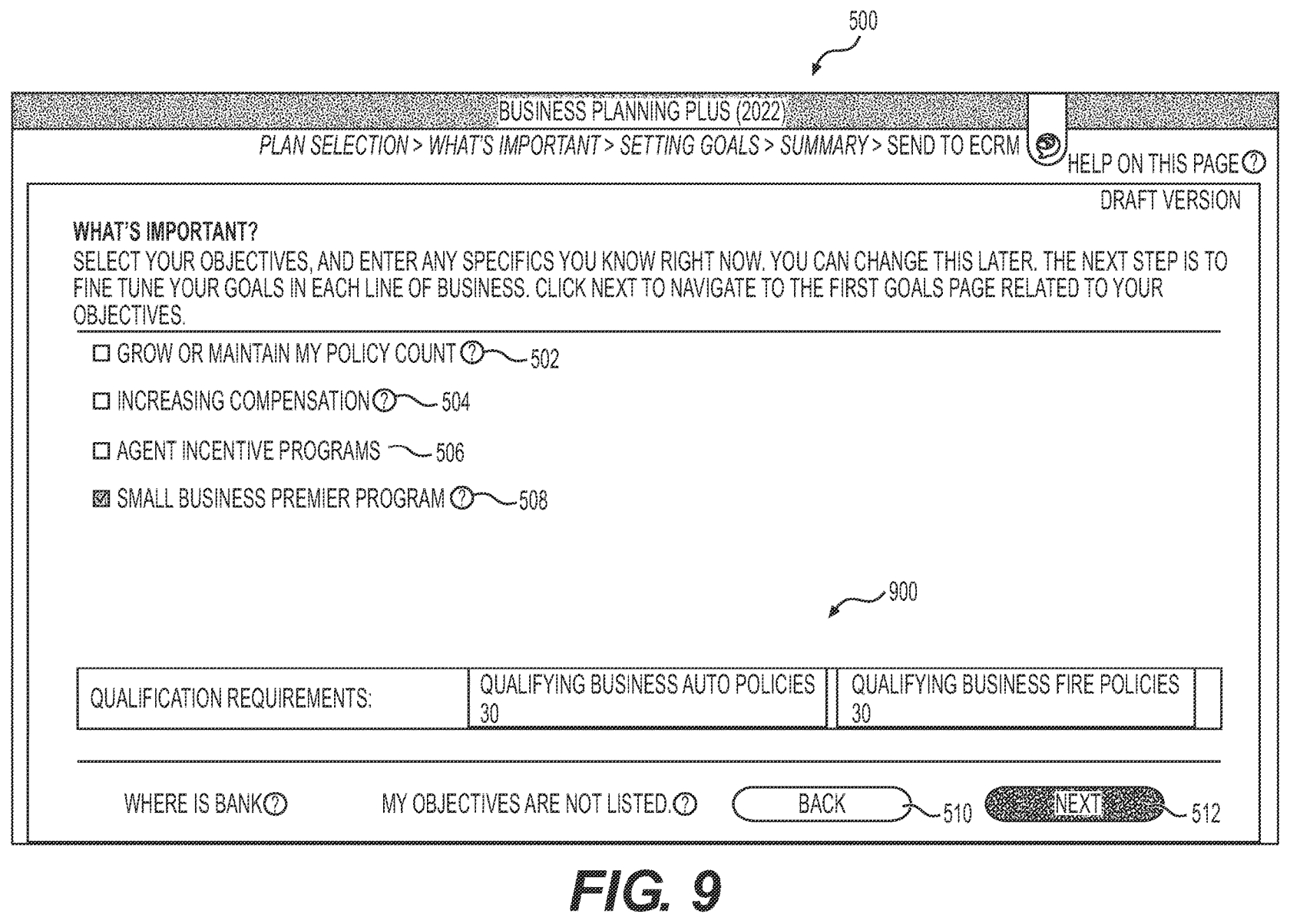

FIG. 9 shows an example of business plan objective GUI 500 after selection of small business premier program interface element 608. For example, business plan objective GUI 500 may present small business premier program qualification requirements 900, which may indicate the number of qualifying policies in each line of business—such as auto and fire insurance policies—the agent must sell in the calendar year for the business plan to qualify for the Small Business Premier Program.

Once the user has finished using business plan objective GUI 500 to select the desired objectives for the business plan, the agent may provide input to next interface element 512. Next interface element 512 may cause business planning software tool 202 to determine which of a plurality of goal setting GUIs, discussed below, to display, allowing the agent to continue creating the business plan.

Figure 10:
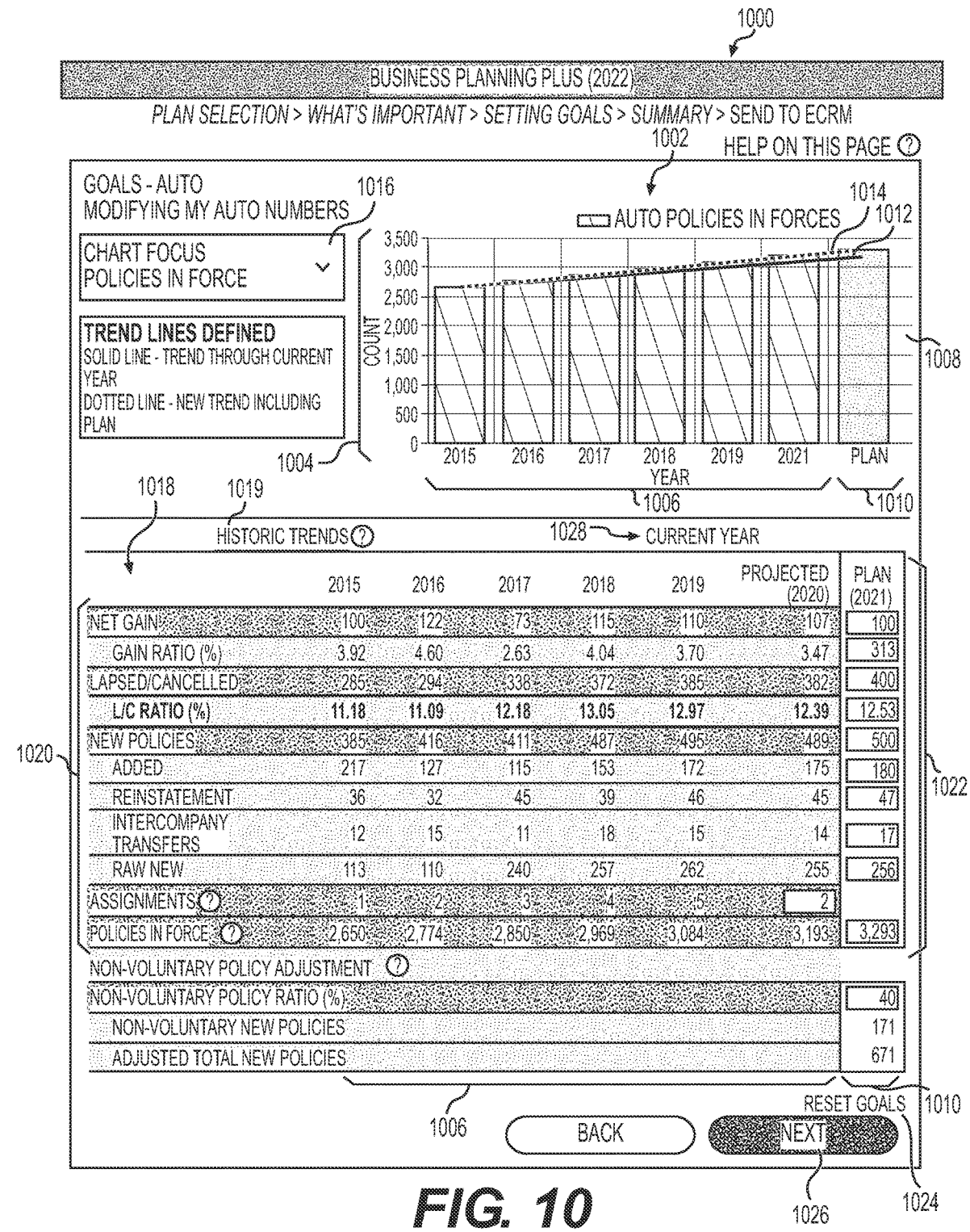
FIGS. 10, 12, and 13 show examples of auto insurance, fire insurance, and life insurance goal setting GUIs, respectively, consistent with the disclosed embodiments.

FIG. 10 shows an exemplary auto insurance goal setting GUI 1000, consistent with the disclosed embodiments. Business planning software tool 202 may be configured to display auto insurance goal setting GUI 1000 when it is determined that the agent has used business plan objective GUI 500 to select grow or maintain my policy count interface element 502 and to further select grow or maintain auto insurance policy count interface element 600. As explained below, auto insurance goal setting GUI 1000 may conveniently provide information the user needs to quickly and efficiently generate a portion of the agent's business plan for the auto insurance line of business. Auto insurance goal setting GUI 1000 provides a visual representation of the agent's historical, present, and planned future performance with respect to policies having certain statuses in each year. This gives the agent a feel for how the agent is currently performing relative to the agent's past performance and helps the agent set goals going forward for future performance. Additionally, auto insurance goal setting GUI 1000 may provide a convenient interface through which the agent may customize and experiment with different potential goals and see how those goals, if met, relate to the agent's past and present performance. This helps the agent continue contributing to the growth of the insurance provider's business in a systematic and sustainable way.

As shown, auto insurance goal setting GUI 1000 may include a policy count chart 1002 for the agent. Policy count chart 1002 may show a number of auto insurance policies 1004 assigned to the agent (e.g., sold by, managed by, or otherwise belonging to the agent) having a certain status over a historical period of time through the present 1006. Policy statuses may include, for example, in force, new, reinstated, lapsed/canceled, transferred from another insurance company, raw new (e.g., an original, new policy), added (e.g., another policy added to an existing customer's account), etc.

Policy count chart 1002 may also show a projected number of polices 1008 to have the selected status during the future time period 1010 of the business plan. Policy count chart 1002 may also show a historical trendline 1012 reflecting the number of auto insurance policies having the selected status over historical period of time through the present 1006 and a projected trendline 1014 adjusted based on the number of polices projected to have the selected status during future time period of the business plan 1010.

Auto insurance goal setting GUI 1000 may have a chart policy status selection interface element 1016 allowing the agent to select the insurance policy status reflected in policy count chart 1002. For example, policy status selection interface element 1016 may provide options for chart 1002 to reflect policies having an in-force, raw new, added, reinstated, transferred from another company, and/or lapsed/canceled status during historical period of time through the present 1006 and projected to have that status during future time period of the business plan 1010. For example, the agent may use policy status selection interface element 1016 to change the policy status reflected by policy count chart 1002 from the in-force to the raw new policy status. In response to this selection, policy count chart 1002 may be updated to reflect, instead of the number of policies in force, the number of new polices belonging to the agent in historical time period through present 1006 and the number of projected new policies belonging to the agent during future time period of the business plan 1010.

As shown in FIG. 10, auto insurance goal setting GUI 1000 may further include a policy count table 1018 for the agent. In a historical trends view 1019, policy count table 1018 may show a number of the agent's auto insurance policies having a plurality of statuses 1020 during historical period of time through the present 1006 and projected to have the plurality of statuses 1020 for future time period 1010 of the business plan. It is to be appreciated that policy count table 1018 may contain the same or similar information to that of policy count chart 1002. In contrast to policy count chart 1002 which may only show information for one policy status at a time—the policy status currently selected using chart type selection interface element 1016—policy count table 1018 may show information for a plurality of policy statuses 1020 simultaneously, with each status reflected in a particular row. For example, as shown in FIG. 10, policy count table 1018 may list the number of the agent's net gained policies (with a gain ratio); lapsed/canceled policies (with a lapsed/canceled ratio); new policies broken down by added, reinstated, intercompany-transferred, and raw new policies; and/or policies in force over historical period of time through the present 1006 and projected to have those statuses during future time period 1010 of the business plan.

Business planning software tool 202 may be configured to automatically populate policy count chart 1002 and policy count table 1018 based on information stored in insurance policy databases 102. For example, based on agent information 402 entered in plan selection GUI 400 (FIG. 1), such as the agent's ID, business planning software tool 202 may retrieve, over network 104, auto insurance policy information associated with the agent stored in auto insurance policy database 110 and may use that information to populate policy count chart 1002 and policy count table 1018. For instance, if the agent selects "policies in force" using chart policy status selection interface element 1016, business planning software 202 may determine from the retrieved information how many polices the agent had in force in each period (e.g., year) over historical period of time through the present 1006 and populate policy count chart 1002 with bar graphs accordingly. Using known techniques and/or mathematical models, business planning software tool 202 may also calculate and/or use projections to populate chart 1002 for historical period of time through the present 1006, to the extent the year is not over, and for future time period 1010 of the business plan. Business planning software tool 202 may similarly generate and populate chart 1002 for other policy statuses selected using chart policy status selection interface element 1016.

Business planning software tool 202 may likewise populate policy count table 1018 based on the information retrieved from auto insurance policy database 110. Specifically, business planning software tool 202 may use the retrieved information to populate table 1018 with the total number of policies of each policy status 1020 occurring in historical period of time through the present 1006 and projected to occur in future time period 1010 of the business plan. For example, to populate table 1018 for the "raw new" policy status among the plurality of policy statuses 1020, business planning software tool 202 may analyze the retrieved insurance policy information to identify which of the agent's auto insurance policies original, new policies occurred over historical period of time through the present 1006 and calculate the total for each year. To the extent the year is not over, business planning software 202 may calculate and/or use projections to populate table 1018 for historical period of time through the present 1006 and for future time period 1010 of the business plan.

Also shown in FIG. 10, policy count table 1018 may also include a goal input interface 1022. Using goal input interface 1022, the agent may input respective goal numbers of policies of each policy status 1020 to achieve in future time period 1010 of the business plan. For example, as shown in FIG. 10, the agent is projected to net 489 new auto insurance policies in 2020 and, using goal input interface 1022, has input a goal of netting 400 new auto insurance policies for future time period 1010 of the business plan (i.e., 2021). As another example, policy count table 1018 shows that the agent is projected to have 3,193 policies in force through the end of 2020 and, using goal input interface 1022, has set a goal to have 3,293 policies in force 2021 (i.e., future time period 1010 of the business plan).

Business planning software tool 202 may be configured to update policy count chart 1002 based on input to goal input interface 1022. Specifically, based on the goal numbers input to goal input interface 1022, business planning software tool 202 may repopulate or regenerate the portion of policy count chart 1002 corresponding to future time period 1010 of the business plan. For instance, in the example of FIG. 10 in which chart 1002 is a bar graph and chart policy status selection interface element 1016 is set to the status "policies in force," business planning software tool 202 may increase or decrease the height of the bar corresponding to future time period 1010 when the agent increases or decreases the number input into goal input interface 1022 corresponding to the "policies in force" policy status 1020. Additionally, business planning software tool 202 may appropriately adjust historical and projected trendlines 1012, 1014 based on the input to goal input interface 1022.

As shown in FIG. 10, auto insurance goal setting GUI 1000 may further include a reset goals interface element 1024. When interface element 1024 receives input, business planning software tool 202 may reset the values in goal input interface 1022 to default values. For example, business planning software tool 202 may calculate default goal numbers of policies for each policy status 1020 for future time period 1010 and populate goal input interface 1022 with the default values. The default goal values may be calculated in any appropriate way, such as by increasing the values for the most recent year of historical period of time through the present 1006 by a certain percentage (e.g., 5%, the average yearly increase over time period 1006, etc.). Business planning software tool 202 may similarly populate goal input interface 1022 with default values when initially displaying auto insurance goal setting GUI 1000, allowing the agent to change the default values if the agent has policy goals that differ from the default values.

As shown in FIG. 10, auto insurance goal setting GUI 1000 may further include a next interface element 1026. When the agent has finished using auto insurance goal setting GUI 1000 to complete the portion of the agent's business plan for the auto insurance line of business, the agent may provide input to next interface element 1026. This may cause business planning software tool 202 to save the agent's business plan in database 116. Next interface element 1026 may additionally cause business planning software tool 202 to proceed to the goal setting GUI for the next objective (e.g., additional lines of business, increasing compensation, agent incentive programs, small business premier program) the agent identified as an objective using interface elements 502-508.

Figure 11:
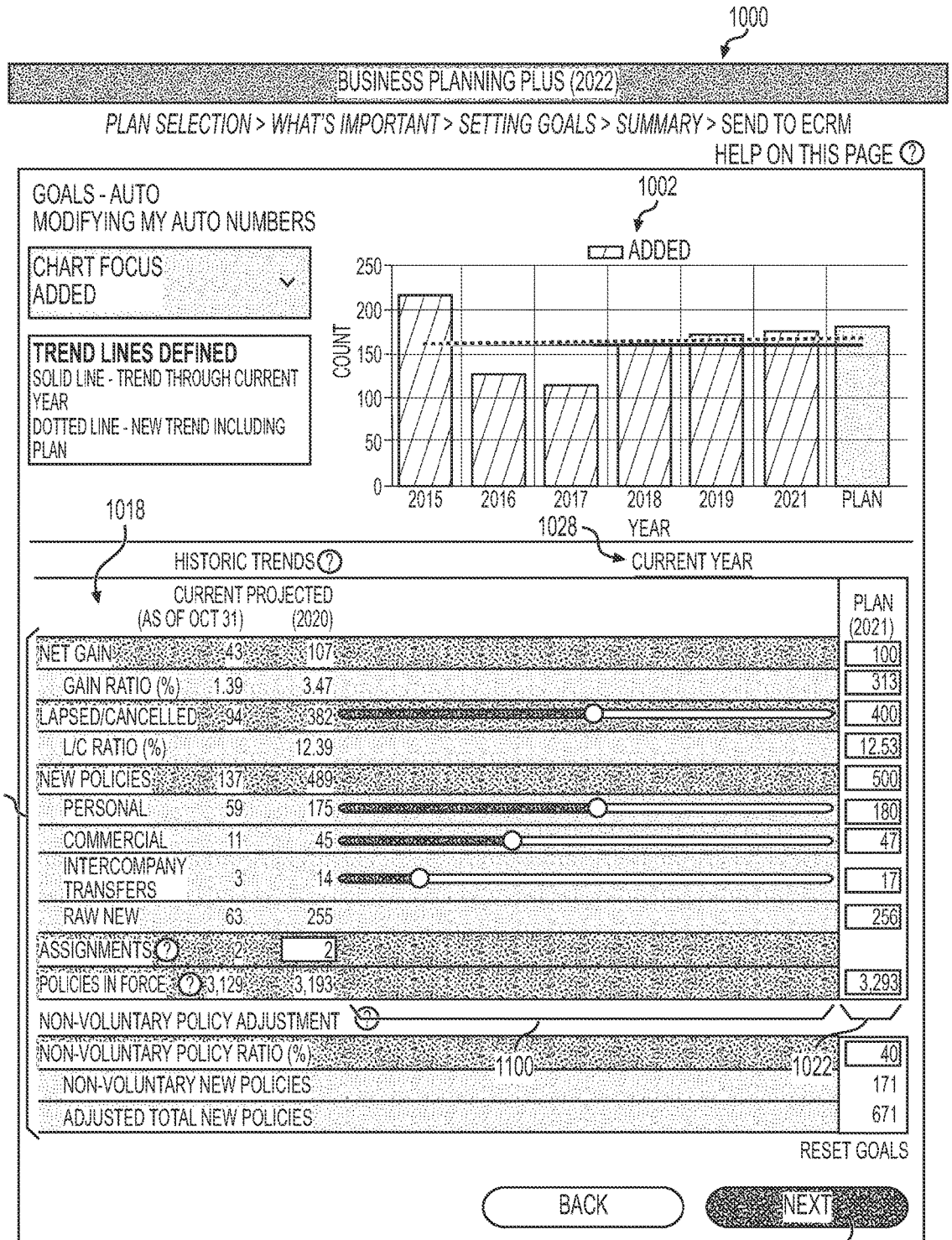
FIG. 11 shows the auto insurance goal setting GUI of FIG. 10 upon selection of a current year view, consistent with the disclosed embodiments.

FIG. 11 shows auto insurance goal setting GUI 1000 upon selection of a current year view 1028 for policy count table 1018. As shown, current year view 1028 may include goal input interface 1022 from FIG. 10 but may further include a second goal input interface 1100. Whereas goal input interface 1022 may allow the agent to enter goal numbers of policies of each policy status 1020 to achieve in future time period 1010 of the business plan as numeric values, second goal input interface 1100 may include sliders or other interface elements (e.g., dials) allowing the agent to set the goal numbers across a continuous range. When a goal number is entered into goal input interface 1022, business planning software tool 202 may adjust second goal input interface 1100 accordingly, and vice versa. For example, if the agent enters a goal of 400 policies for the lapsed/canceled policy status 1020 into goal input interface 1022, business planning software tool 202 may adjust the corresponding slider (or other interface element) of second goal input interface 1100 for the lapsed/canceled policy status 1020 to a position within the range corresponding to 400. And, likewise, if the agent adjusts the slider or other interface element of second goal input interface 1100 to a position within the range corresponding to 180 "new" added policies, as shown, business planning software tool 202 may populate goal input interface 1022 for the "new" policy status 1020 with the number 180.

Figure 12:
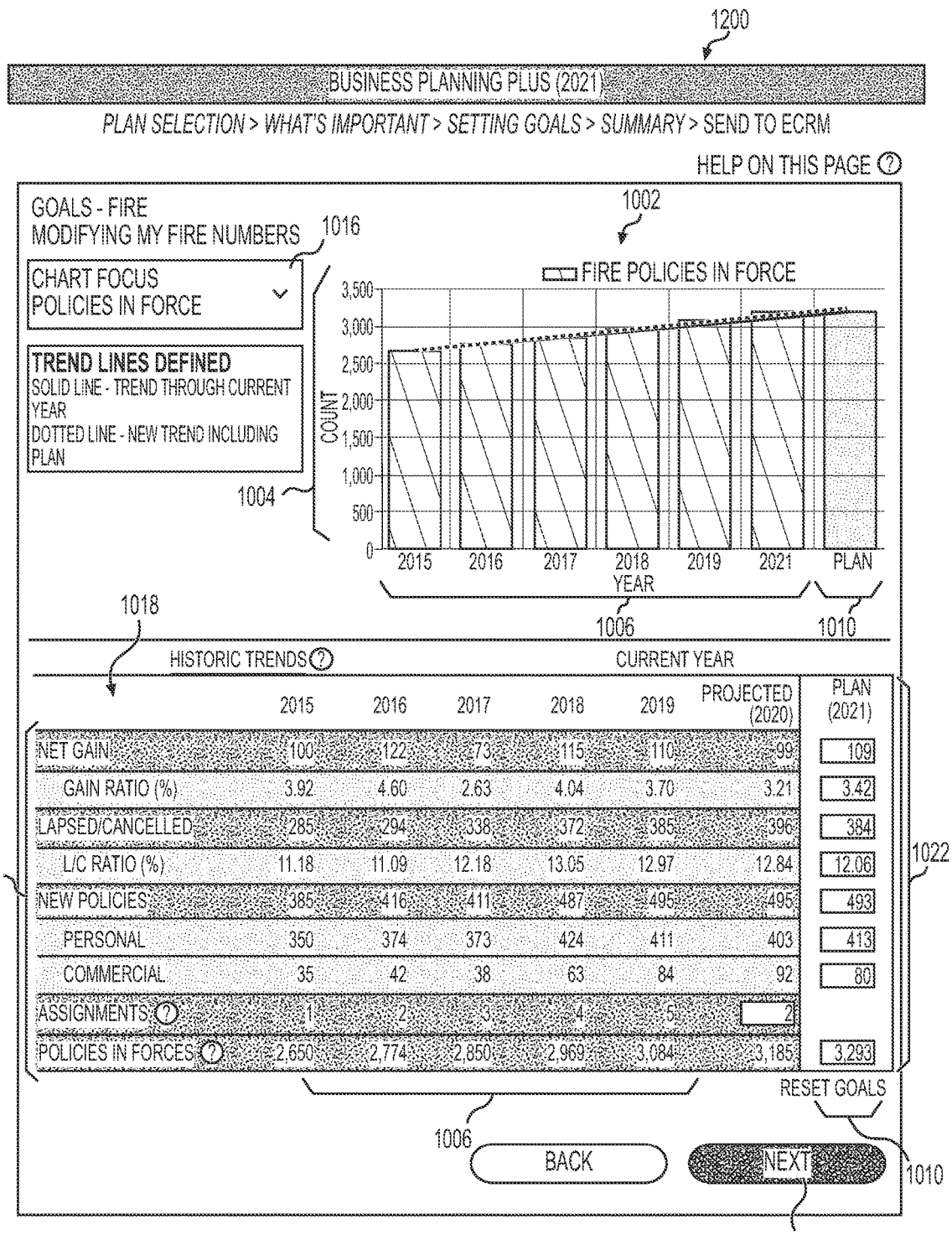
Figure 13:
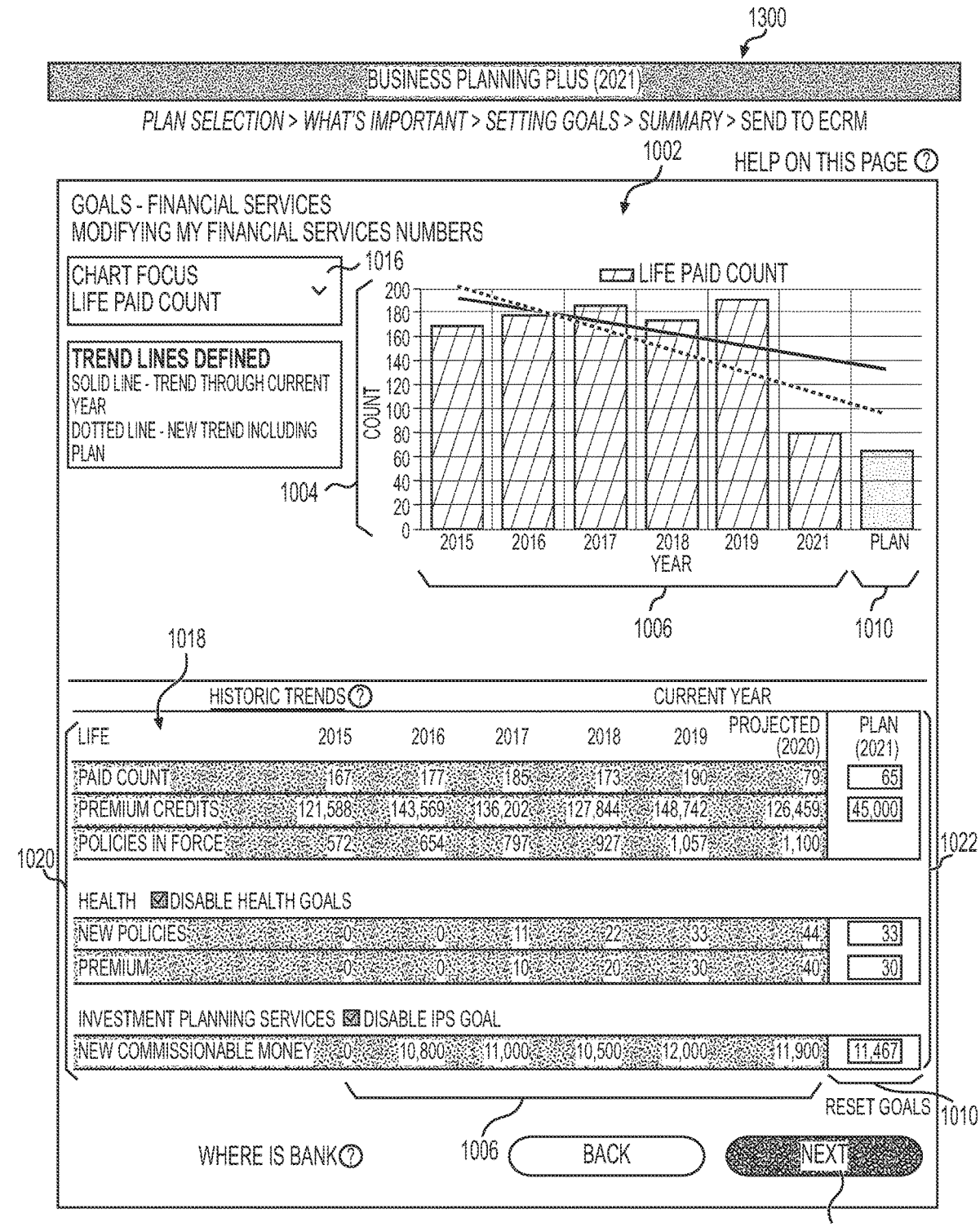

FIGS. 12 and 13 respectively show exemplary fire insurance and life insurance goal setting GUIs 1200, 1300, consistent with the disclosed embodiments. Business planning software tool 202 may be configured to display fire insurance goal setting GUI 1200 when it is determined that the agent has used business plan objective GUI 500 to select grow or maintain my policy count interface element 502 and to further select grow or maintain my fire policy count interface element 602. Likewise, business planning software tool 202 may be configured to display life insurance goal setting GUI 1300 when it is determined that the agent has selected grow or maintain my policy count interface element 502 and further selected grow or maintain my life policy count interface element 604.

Similar to auto insurance goal setting GUI 1000, fire and life insurance goal setting GUIs 1200, 1300 may conveniently provide information the agent needs to quickly and efficiently generate portions of a business plan for the fire and life insurance lines of business, respectively. Goal setting GUIs 1200 and 1300 give the agent a visual representation of the agent's historical, present, and planned future performance with respect to various policy statuses (e.g., new, lapsed/canceled, in-force, reinstated, etc.) in each year. This gives the agent a feel for how the agent is currently performing relative to the agent's past performance across policy statuses and helps the agent set goals going forward for future performance in the fire and life insurance lines of business. Additionally, goal setting GUIs 1200, 1300 may provide convenient interfaces through which the agent may customize and experiment with different potential goals and see how those goals, if met, compare to the agent's past and present performance. Whereas the difficult and haphazard nature of conventional business planning in the insurance industry discourages agents from creating and adhering to business plans, the ease with which the agent may generate the fire and life insurance portions of the business plan using goal setting GUIs 1200, 1300 encourages agents to regularly create and use business plans in their day-to-day work. Thus, agents may continue contributing to the growth of their own business, as well as the insurance provider's business generally, in a systematic and convenient way.

Fire insurance and life insurance goal setting GUIs 1200, 1300 may have a similar configuration and operation to auto insurance goal setting GUI 1000 discussed above but may have information relating to the agent's fire and life insurance policies, respectively, rather than to the agent's auto insurance policies. For example, as shown in FIGS. 12 and 13, goal setting GUIs 1200 and 1300 may have respective policy count charts 1002 for the fire and life insurance lines of business showing the agent's performance with respect to policies having a certain status selected using chart policy status selection interface element 1016 over historical period of time through the present 1006 and projected for future time period 1010 of the business plan.

Likewise, goal setting GUIs 1200 and 1300 may similarly have respective policy count tables 1018 for the fire and life insurance lines of business with a historical view showing the number of auto insurance policies of a plurality of statuses 1020 belonging to the agent over historical period of time through the present 1006 and projected for future time period 1010 of the business plan. As with the auto insurance line of business, policy count tables 1018 for the fire and life insurance lines of business may include respective goal input interfaces 1022, 1100 allowing input of respective goal numbers of policies of each policy status 1020 to achieve in future time period 1010 of the business plan. Additionally, goal setting GUIs 1200, 1300 may include next interface elements 1026 allowing the agent to respectively save the fire and life insurance portions of the agent's business plan in database 116 and cause business planning software tool 202 to proceed to the goal setting GUI for another objective (e.g., additional lines of business, increasing compensation, agent incentive programs, small business premier program) the agent identified as an objective using interface elements 502-508 (FIG. 5).

Figure 14:
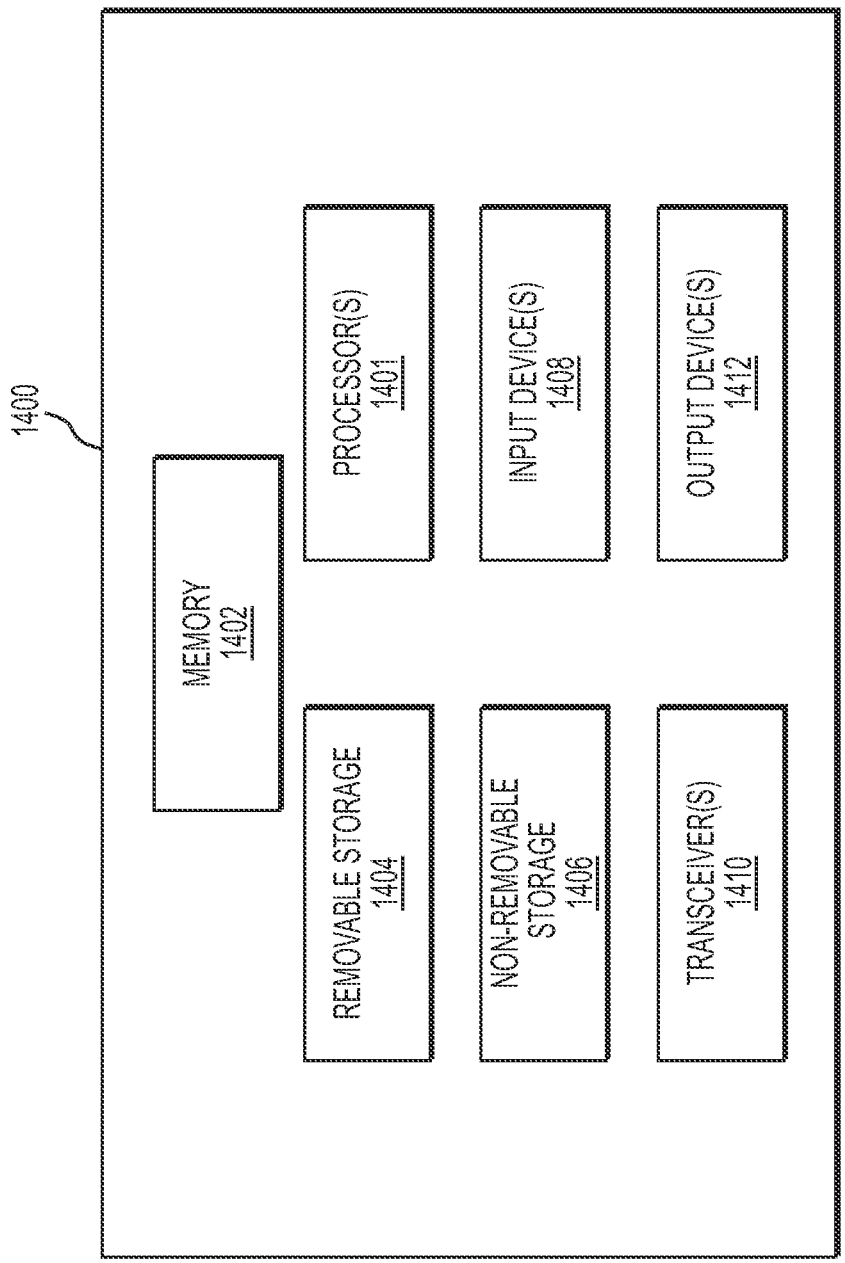
FIG. 14 shows a representation of a computing device used by agents of an insurance provider to access the access insurance business planning system of FIG. 1.

FIG. 14 shows basic, high-level components of a computing device 1400 through which agents 108 may access and use access insurance business planning system 106, including software tools 118. For example, computing device 1400 may be a desktop computer, a laptop computer, a mobile device, or any other computing device known in the art. Computing device 1400 may communicate with insurance business planning system 106 over network 104, including one or more local networks and/or the Internet.

Computing device 1400 may include processor(s) 1401 and memory 1402. Depending on exact configuration and type of computing device, memory 1402 may be volatile (such as RAM), non-volatile (such as ROM, flash memory, etc.) or some combination of the two. In some examples, processor(s) 1401 may be a central processing unit (CPU) or other processing unit or component known in the art. Furthermore, the processor(s) 1401 may include any number of processors and/or processing cores. Processor(s) 1401 may be configured to retrieve and execute instructions from the memory 1402, including instructions to perform the processes, methods, and steps described herein. Processor(s) 1401, executing the instructions, may perform the functions herein in concert with insurance business planning system 106.

The memory 1402 may be described as non-transitory computer-readable media or machine-readable storage memory and may include removable and non-removable media implemented in any method or technology for storage of information, such as computer executable instructions, data structures, program modules, or other data. Memory 1402 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information.

Computing device 1400 may include additional data storage devices (removable and/or non-removable) such as, for example, magnetic disks, optical disks, or tape. Such additional storage is illustrated in FIG. 14 by removable storage 1404 and non-removable storage 1406. Tangible computer-readable media can include volatile and non-volatile, removable and non-removable media implemented in any method or technology for storage of information, such as computer readable instructions, data structures, program modules, or other data for performing the functions disclosed herein. Memory 1402, removable storage 1404, and non-removable storage 1406 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store information. Any such tangible computer-readable media can be part of computing device 1400.

Memory 1402, removable storage 1404, and/or non-removable storage 1406 may in some cases include storage media used to transfer or distribute instructions, applications, and/or data. In some cases, memory 1402, removable storage 1404, and/or the non-removable storage 1406 may include data storage that is accessed remotely, such as databases 102, 116 that computing device 1400 access over network 104. In various examples, any or all of memory 1402, removable storage 1404, and/or non-removable storage 1406 may store programming instructions that, when executed, implement some or all of the function functionality described herein.

Computing device 1400 may also include input device(s) 1408, such as a keypad, a cursor control, a touch-sensitive display, voice input device, etc., and output device(s) 1412 such as a display, speakers, printers, etc. These devices are well known in the art and need not be discussed at length here. And, as illustrated in FIG. 14, computing device 1400 may also include one or more wired or wireless transceiver(s) 1410. For example, 1 transceiver(s) 410 can include a network interface card (NIC), a network adapter, a LAN adapter, or a physical, virtual, or logical address to connect to various networks, devices, or components illustrated in figures herein. To increase throughput when exchanging wireless data, transceiver(s) 1410 can utilize multiple-input/multiple-output (MIMO) technology. Transceiver(s) 1410 can comprise any sort of wireless transceivers capable of engaging in wireless, radio frequency (RF) communication. Transceiver(s) 1410 can also include other wireless modems, such as a modem for engaging in Wi-Fi, WiMAX, Bluetooth, infrared communication, and the like.

Figure 15:
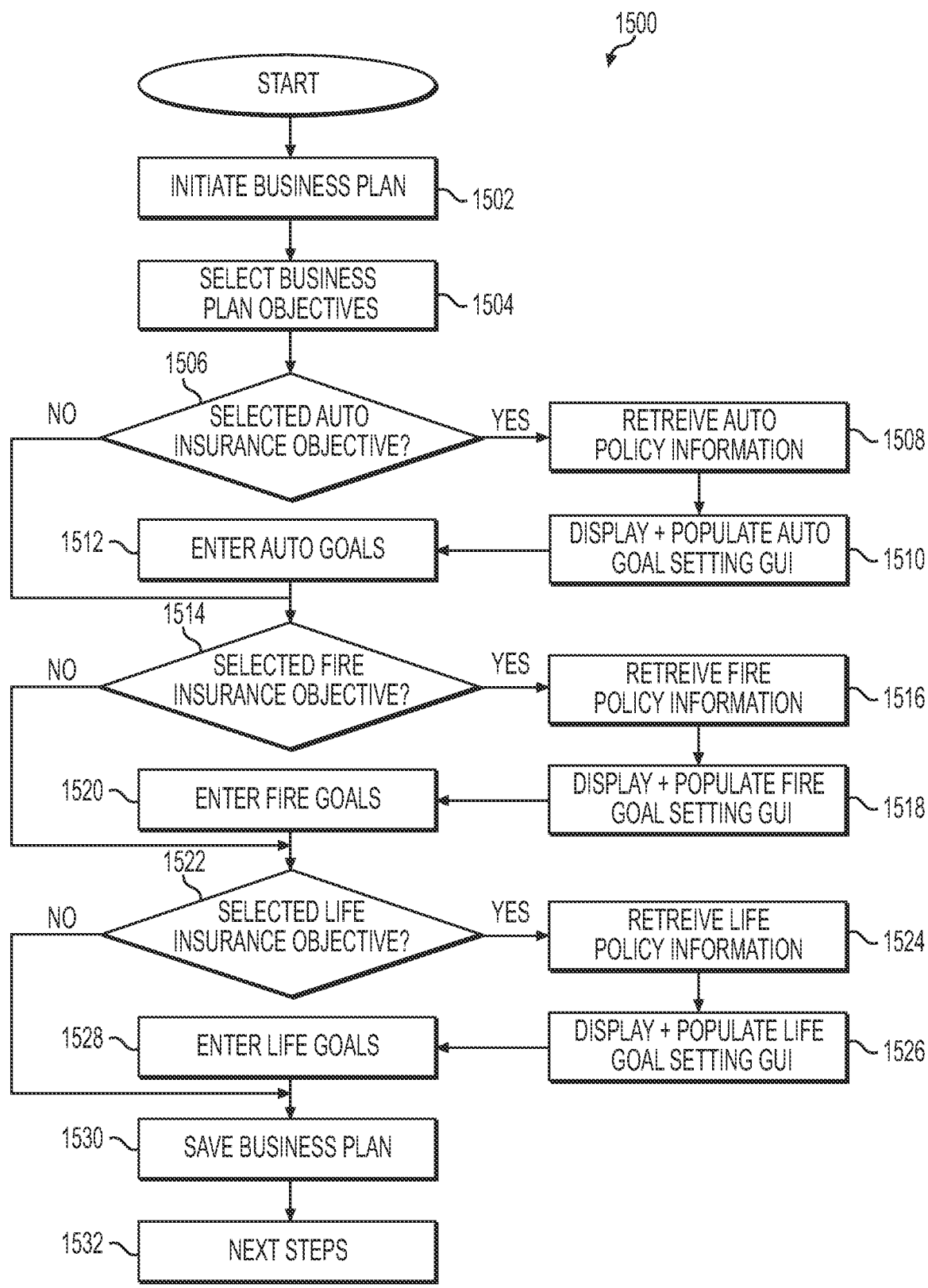
FIG. 15 shows an exemplary method of creating an insurance business plan, consistent with the disclosed embodiments.

FIG. 15 shows an exemplary method 1500 for creating a business plan, consistent with the disclosed embodiments. Method 1500 may be performed by computing device 1400, in concert with insurance business planning system 106, executing business planning software tool 202 and/or other software tools 118. For example, through business planning software tool 202 and/or other software tools 118, computing device 1400 may interact with insurance business planning system 106 over network 104 in a client-server or client-cloud relationship to carry out method 1500.

In step 1502, a business plan may be initiated. For example, an agent 108 or other team member (hereafter "user") using computing device 1400 may access business planning software tool 202. For example, the user may log in to business planning software tool 202, and computing device 1400 may present plan selection GUI 400 (FIG. 4). Using year interface element 404, the agent may select the year for which the user desires to create or modify a business plan (e.g., 2021 or 2022).

In step 1504, the user may select objectives for the business plan. For example, the user may provide input to continue interface element 406, causing business planning software tool 202 to initiate creation and/or modification of the business plan by proceeding to business plan objective GUI 500 (FIG. 5). Using business plan objective GUI 500, the user may select objectives deemed important for the business plan during the plan year selected in step 1502. For example, desired objectives may include growing the agent's policy count in the auto, fire, and life insurance lines of business. Accordingly, the user may provide input to select grow or maintain my policy count interface element 502, and then further select interface elements 600-604 (FIG. 6). As another example, the user may only have the objective to grow the agent's policy count in the auto insurance line of business and may therefore only select grow or maintain auto insurance policy count interface element 600.

In step 1506, business planning software tool 202 may determine whether the user selected the objective to grow or maintain the agent's auto insurance policy count in step 1504. If so, in step 1508, business planning software tool 202 may retrieve from auto insurance policy database 110, over network 104, auto insurance policy information associated with the agent. For example, business planning software tool 202 may look up auto insurance policies associated with agent information 402 (e.g., the agent's name, agent ID, employee number, etc.), download the associated insurance policy information over network 104, and store it in memory.

In step 1510, business planning software tool 202 may display auto insurance goal setting GUI 1000 (FIG. 10) and populate it based on the auto insurance information associated with the agent retrieved in step 1506. For example, business planning software tool 202 may populate policy count chart 1002 for a default policy status (e.g., policies in force), as discussed above. Additionally, business planning software tool 202 may populate policy count table 1018 based on the auto insurance information associated with the agent retrieved in step 1506, as discussed above.

In step 1512, the user may enter the agent's goals for the auto insurance business objective into auto insurance goal setting GUI 1000. For example, as discussed above, the user may view the populated policy count chart 1002 and policy count table 1018 and assess the agent's performance in the auto insurance line of business over historical period of time through the present 1006 and determine appropriate policy count goals for each policy status 1020 of policy for future time period 1010 of the business plan (i.e., 2021). Having determined appropriate goals, the user may enter them into auto insurance goal setting GUI 1000 using goal input interface 1022 and/or second goal input interface 1100 (FIG. 11), as described above. Once the user is satisfied with the entered goals for the auto insurance line of business, the user may provide input to next interface element 1026, which may cause business planning software tool 202 to save the information entered into auto insurance goal setting GUI 1000 for the auto insurance portion of the business plan in memory and/or in business plan database 116.

Business planning software tool 202 may proceed to step 1514 following step 1512 and/or following step 1506 if it is determined that user did not select the objective to grow or maintain the agent's auto insurance policy count. In step 1514, business planning software tool 202 may determine whether the user selected the objective to grow or maintain the agent's fire insurance policy count in step 1504. If so, in step 1516, business planning software tool 202 may retrieve from fire insurance policy database 112, over network 104, fire insurance policy information associated with the agent. For example, business planning software tool 202 may look up fire insurance policies associated with agent information 402 (e.g., the agent's name, agent ID, employee number, etc.), download the associated insurance policy information over network 104, and store it in memory.

In step 1518, business planning software tool 202 may display fire insurance goal setting GUI 1200 (FIG. 12) and populate it based on the fire insurance information associated with the agent retrieved in step 1516. For example, business planning software tool 202 may populate policy count chart 1002 for a default policy status (e.g., policies in force) for the fire insurance line of business, as discussed above. Additionally, business planning software tool 202 may populate policy count table 1018 based on the fire insurance information associated with the agent retrieved in step 1506, as discussed above.

In step 1520, the user may enter the agent's goals for the fire insurance business objective into fire insurance goal setting GUI 1200. For example, as discussed above, the user may view the populated policy count chart 1002 and policy count table 1018 and assess the agent's performance in the fire insurance line of business over historical period of time through the present 1006 and determine appropriate policy count goals for each policy status 1020 for future time period 1010 of the business plan (e.g., 2021). Having determined appropriate goals for the agent's fire insurance line of business, the user may enter them into GUI 1200 using goal input interface 1022 and/or second goal input interface 1100, as described above. Once the user is satisfied with the entered goals for the fire insurance line of business, the user may provide input to next interface element 1026, which may cause business planning software tool 202 to save the information entered into goal setting GUI 1200 for the fire insurance portion of the business plan in memory and/or in business plan database 116.

Business planning software tool 202 may proceed to step 1522 following step 1520 and/or following step 1514 if it is determined that user did not select the objective to grow or maintain the agent's fire auto insurance policy count. In step 1522, business planning software tool 202 may determine whether the user selected the objective to grow or maintain the agent's life insurance policy count in step 1504. If so, in step 1524, business planning software tool 202 may retrieve from life insurance policy database 114, over network 104, fire insurance policy information associated with the agent. For example, business planning software tool 202 may look up life insurance policies associated with agent information 402 (e.g., the agent's name, agent ID, employee number, etc.), download the associated insurance policy information over network 104, and store it in memory.

In step 1526, business planning software tool 202 may display life insurance goal setting GUI 1300 (FIG. 13) and populate it based on the life insurance information associated with the agent retrieved in step 1524. For example, business planning software tool 202 may populate policy count chart 1002 for a default policy status (e.g., policies in force) for the life insurance line of business, as discussed above. Additionally, business planning software tool 202 may populate policy count table 1018 based on the life insurance information associated with the agent retrieved in step 1506, as discussed above.

In step 1528, the user may enter the agent's goals for the life insurance business objective into fire insurance goal setting GUI 1300. For example, as discussed above, the user may view the populated policy count chart 1002 and policy count table 1018 and assess the agent's performance in the life insurance line of business over historical period of time through the present 1006 and determine appropriate policy count goals for each policy status 1020 for future time period 1010 of the business plan (e.g., 2021). Having determined appropriate goals for the agent's life insurance line of business, the user may enter them into GUI 1300 using goal input interface 1022 and/or second goal input interface 1100, as described above. Once the user is satisfied with the entered goals for the life insurance line of business, the user may provide input to next interface element 1026, which may cause business planning software tool 202 to save the information entered into GUI 1300 for the life insurance portion of the business plan in memory and/or in business plan database 116.

In step 1530, insurance business planning software tool 202 may save the agent's business plan in business plan database 116. The user may periodically return to business planning software tool 202 at any desired time to view the business plan, modify any aspects of the business plan, and see the agent's progress towards hitting the previously set goals. For example, when the user accesses any of the goal setting GUIs 1000, 1200, 1300 at a later date, business planning software tool 202 may re-populate the GUIs with the most recent insurance information from insurance provider databases 102 so that the agent's progress towards the goals can be seen. That is, business planning software tool 202 may update the information displayed in policy count chart 1002 and policy count table 1018 in the goal setting GUIs 1000, 1200, 1300 for each line of business.

Using this updated information, the user may check the agent's goals to see if they remain appropriate or warrant any modifications. For example, the user may check that projected trendline 1014 remains on track with, or exceeding, historical trendline 1012. This may indicate that the agent's recent and projected future performance remains on par with the agent's historical performance, and the agent can expect future growth in the near term consistent with the agent's historical growth in a particular line of business. If the agent's performance does not appear on track to achieve the goals, adjustments can be made in advance. For example, perhaps the original goals were too ambitious, and so the user via goal setting GUIs 1000, 1200, 1300 may reduce the goals to more realistic goals. Or, perhaps, the agent's performance leaves room for improvement, and the agent can be notified so that the agent can take early steps to increase performance, get on track, and achieve the original goals without modification.

Additionally, the updated policy count tables 1018 of goal setting GUIs 1000, 1200, 1300 provide the user with a snapshot of how the agent is performing, not just within the particular line of business, but within each particular policy status 1020. This is helpful because an agent may be overperforming, adequately performing, or underperforming with respect to certain policy statuses 1020, and performance within each policy status in the aggregate determines the agent's overall performance and progress toward a goal. For example, at a given point in time, despite performing adequately on added and new policy statuses, the agent might be significantly underperforming on reinstated policy statuses, bringing the agent's overall performance on the new policy status below the agent's goal. Armed with this information, the agent may shift from a new customer drive to focus efforts on getting existing or former customers whose policies have recently lapsed or been canceled to reinstate their policies.

As shown in FIG. 15, method 1500 may include taking next steps 1532 with the completed business plan. It will be appreciated that, once a business plan is complete, it may be distributed to other team members and partners to help enact and put the plan into action. For example, the completed business plan may be transmitted to or shared with other software tools 118—such as digital whiteboard software tool 204, team member incentives software tool 206, a reporting software tools 208—which may further process the business plan and allow other team members and partners to view the business plan and take additional steps to implement it.

Next steps 1532 may include creating a marketing plan based on the business plan. For example, action plan component 304 may present historical marketing data and historical leading indicator results for each line of business. Using digital whiteboard software tool 204, team members may set activity goals at the insurance agent office level. Then, specific activity goals may be distributed to the team. Action plan component 304 may display a summary of marketing data for each line of business, aligned with the activity goals set by the team. Then the goals may be shared with the agent's customers/business partners, over network 104, via Electronic Customer Relationship Management (ECRM) systems.

Next steps 1532 may further include assigning the goals of the business plan to the agent's team members using goal distribution component 306. For example, goal distribution component 306 may be used to identify team members who will be responsible for what activities and generate a team plan. Goal distribution component 306 may be used to distribute goals and action items. In some embodiments, team members may be assigned their own, smaller team member plan as part of a lager electronic plan. Such detailed level of planning may result in shared accountability among the team. Various integration GUIs may provide access to the goal-distribution based feature, e.g., to visit their distributed/assigned goal. Additionally, goal distribution component 306 may transmit the goals of the business plan to the customers/business partners via the ECRM.

Next steps 1532 may further include setting leading indicator (activity) goals. For example, using digital whiteboard software tool 204, activity goals may be set at the office level. The activity goals may be assigned to team members and also sent to the ECRM.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

For example, business planning software tool 200 may have additional goal setting GUIs beyond the examples described for auto, fire, and life insurance 1000, 1200, 1300. As an example, business planning software tool 202 may include goal setting GUIs for other types of financial services or products besides life insurance, such as banking, wealth management, mutual funds, etc. Goal setting GUIs for other types of insurances may also be included, such as motorcycle, boating, mobile home, general liability, medical malpractice insurance, etc.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method for generating insurance business plan graphical user interfaces, the method comprising:
   receiving an identification of an agent associated with an insurance business plan and a selection of a future time period for the insurance business plan;
   generating, by a processor, a business plan objective graphical user interface (GUI) presenting for selection a plurality of insurance business plan objectives, wherein at least one of the objectives is to grow or maintain insurance policy counts for one or more insurance lines of business;
   detecting, by the processor via the business plan objective GUI, a selection of an objective to grow or maintain insurance policy counts for one or more insurance lines of business;
   generating for selection, by the processor and based on a determination that the objective to grow or maintain insurance policy counts for one or more insurance lines of business has been selected, a plurality of indications of insurance lines of business;
   detecting, by the processor via the business plan objective GUI, a selection of an indication of an insurance line of business of the plurality of indications of insurance lines of business;
   retrieving, by the processor from an insurance policy database over a network, insurance policy information for insurance policies assigned to the agent in the insurance line of business;
   determining, by the processor, a number of policies projected to have a selected status during the selected future time period of the business plan based at least in part on:
      a number of insurance policies assigned to the agent having the selected status during a historical period of time through the present; and
      the selection of the objective to grow or maintain insurance policy counts for one or more insurance lines of business;
   determining, by the processor, a first trend based at least in part on the number of policies projected to have the selected status and the selected future time period;
   determining, by the processor, a second trend based at least in part on the number of insurance policies assigned to the agent having the selected status and the selected future time period;
   generating, by the processor, a goal setting GUI for the insurance line of business by:
      populating a first GUI element of the goal setting GUI using first data representing the retrieved insurance policy information;
      populating a second GUI element of the goal setting GUI using second data representing the number of insurance policies assigned to the agent having the selected status;
      populating a third GUI element of the goal setting GUI using third data representing the number of policies projected to have the selected status;
      populating a fourth GUI element of the goal setting GUI using fourth data representing the first trend; and
      populating a fifth GUI element of the goal setting GUI using fifth data representing the second trend;
   detecting, by the processor via the goal setting GUI, user input modifying the number of policies projected to have the selected status represented in the third GUI element;
   determining, by the processor and in response to detecting the user input, a third trend based at least in part on the modified number of policies projected to have the selected status and the selected future time period; and
   populating, by the processor, the fourth GUI element of the goal setting GUI using sixth data representing the third trend.

2. The method of claim 1, wherein at least one of the plurality of indications of insurance lines of business are associated with one or more of auto insurance, fire insurance, and life insurance.

3. The method of claim 1, wherein the the selected status is one or more of in-force, raw new, added, reinstated, transferred from another insurance company, and lapsed/canceled.

4. The method of claim 1, wherein generating the goal setting GUI further includes generating a policy count table showing a number of insurance policies assigned to the agent having the selected status during the historical period of time through the present and projected to have the selected status during the selected future period of time of the business plan.

5. The method of claim 1, wherein generating the goal setting GUI further includes generating a goal input interface configured to receive input of respective goal numbers of policies having the selected status for the selected future period of time of the business plan.

6. The method of claim 5, further comprising storing, in a business plan database, the business plan with the input goal numbers of policies having the selected status for the selected future time period of the business plan.

7. The method of claim 5, further comprising updating one or more of the policy count chart and the policy count table based on the input goal numbers of policies having the selected status for the selected future time period of the business plan.

8. A non-transitory computer-readable storage medium storing computer program instructions that, when executed by a processor, cause the processor to perform a method of generating an insurance business plan, the method comprising:
   receiving an identification of an agent associated with the insurance business plan and a selection of a future time period for the insurance business plan;
   generating a business plan objective graphical user interface (GUI) presenting for selection a plurality of insurance business plan objectives, wherein one of the objectives is to grow or maintain insurance policy counts for one or more insurance lines of business;
   detecting, via the business plan objective GUI, a selection of an objective to grow or maintain insurance policy counts for one or more insurance lines of business;
   generating for selection, based on a determination that the objective to grow or maintain insurance policy counts for one or more insurance lines of business has been selected, a plurality of indications of insurance lines of business;
   detecting, via the business plan objective GUI, a selection of an indication of an insurance line of business of the plurality of indications of insurance lines of business;
   retrieving, from an insurance policy database over a network, insurance policy information for insurance policies assigned to the agent in the insurance line of business;
   determining a number of policies projected to have a selected status during the selected future time period of the business plan based at least in part on:
      a number of insurance policies assigned to the agent having the selected status during a historical period of time through the present; and
      the selection of the objective to grow or maintain insurance policy counts for one or more insurance lines of business;
   determining a first trend based at least in part on the number of policies projected to have the selected status and the selected future time period;
   determining a second trend based at least in part on the number of insurance policies assigned to the agent having the selected status and the selected future time period;
   generating a goal setting GUI for the insurance line of business by:
      populating a first GUI element of the goal setting GUI using first data representing the retrieved insurance policy information;
      populating a second GUI element of the goal setting GUI using second data representing the number of insurance policies assigned to the agent having the selected status;
      populating a third GUI element of the goal setting GUI using third data representing number of policies projected to have the selected status;
      populating a fourth GUI element of the goal setting GUI using fourth data representing the first trend; and
      populating a fifth GUI element of the goal setting GUI using fifth data representing the second trend;
   detecting, via the goal setting GUI, user input modifying the number of policies projected to have the selected status represented in the third GUI element;
   in response to detecting the user input, determining a third trend based at least in part on the modified number of policies projected to have the selected status and the selected future time period; and
   populating the fourth GUI element of the goal setting GUI using sixth data representing the third trend.

9. The non-transitory computer-readable storage medium of claim 8, wherein at least one of the plurality of indications of insurance lines of business are associated with one or more of auto insurance, fire insurance, and life insurance.

10. The non-transitory computer-readable storage medium of claim 8, wherein the selected status is selected from a plurality of statuses that include one or more of in-force, raw new, added, reinstated, transferred from another insurance company, and lapsed/canceled.

11. The non-transitory computer-readable storage medium of claim 8, wherein generating the goal setting GUI further includes generating a policy count table showing a number of insurance policies assigned to the agent having each of a plurality of statuses during the historical period of time through the present and projected to have each of the plurality of statuses during the selected future period of time of the business plan.

12. The non-transitory computer-readable storage medium of claim 8, wherein the generating goal setting GUI further includes generating a goal input interface configured to receive input of respective goal numbers of policies having each of a plurality of statuses for the selected future period of time of the business plan.

13. The non-transitory computer-readable storage medium of claim 12, wherein the method further includes storing, in a business plan database, the business plan with the input goal numbers of policies having each of the plurality of statuses for the selected future time period of the business plan.

14. The non-transitory computer-readable storage medium of claim 12, wherein the method further includes updating one or more of the policy count chart and the policy count table based on the input goal numbers of policies having each of the plurality of statuses for the selected future time period of the business plan.

15. A computing terminal, comprising;
   a memory storing computer program instructions; and
   one or more processors configured to execute the instructions to perform a method for generating an insurance business plan, including to:
      receive input of an identification of an agent associated with the insurance business plan and a selection of a future time period for the insurance business plan;
      generate a business plan objective graphical user interface (GUI) presenting for selection a plurality of insurance business plan objectives, wherein one of the objectives is to grow or maintain insurance policy counts for one or more insurance lines of business;

detect, via the business plan objective GUI, a selection of an objective to grow or maintain insurance policy counts for one or more insurance lines of business;

generate for selection, based on a determination that the objective to grow or maintain insurance policy counts for one or more insurance lines of business has been selected, a plurality of indications of insurance lines of business;

detect, via the business plan objective GUI, a selection of an indication of an insurance line of business of the plurality of indications of insurance lines of business;

cause a retrieval, from an insurance policy database over a network, of insurance policy information for insurance policies assigned to the agent in the insurance line of business;

determine a number of policies projected to have a selected status during the selected future time period for the insurance business plan based at least in part on:
  a number of insurance policies assigned to the agent having the selected status during a historical period of time through the present; and
  the selection of the objective to grow or maintain insurance policy counts for one or more insurance lines of business;

determine a first trend based at least in part on the number of policies projected to have the selected status and the selected future time period;

determine a second trend based at least in part on the number of insurance policies assigned to the agent having the selected status and the selected future time period;

generate a goal setting GUI for the insurance line of business by:
  populating a first GUI element of the goal setting GUI using first data representing the retrieved insurance policy information;
  populating a second GUI element of the goal setting GUI using second data representing the number of insurance policies assigned to the agent having the selected status during the historical period of time through the present;
  populating a third GUI element of the goal setting GUI using third data representing a number of policies projected to have the selected status during the selected future time period for the insurance business plan;
  populating a fourth GUI element of the goal setting GUI using fourth data representing the first trend; and
  populating a fifth GUI element of the goal setting GUI using fifth data representing the second trend;

detect, via the goal setting GUI, user input modifying the number of policies projected to have the selected status represented in the third GUI element;

determine, in response to detecting the user input, a third trend based at least in part on the modified number of policies projected to have the selected status and the selected future time period; and populate the fourth GUI element of the goal setting GUI using sixth data representing the third trend.

16. The computing terminal of claim 15, wherein at least one of the plurality of indications of insurance lines of business are associated with one or more of auto insurance, fire insurance, and life insurance.

17. The computing terminal of claim 15, wherein the selected status is selected from a plurality of statuses that include one or more of in-force, raw new, added, reinstated, transferred from another insurance company, and lapsed/canceled.

18. The computing terminal of claim 15, wherein generating the goal setting GUI further includes generating a policy count chart showing a number of insurance policies assigned to the agent having the selected status during the historical period of time through the present and showing a number of policies projected to have the selected status during the selected future time period of the business plan.

19. The computing terminal of claim 15, wherein generating the goal setting GUI further includes generating a goal input interface configured to receive input of respective goal numbers of policies having the selected status for the selected future period of time of the business plan.

20. The computing terminal of claim 19, wherein the one or more processors are further configured to execute the instructions to store, in a business plan database, the business plan with the input goal numbers of policies having the selected status for the selected future time period of the business plan.

* * * * *